US012563538B2

(12) United States Patent
Kim et al.

(10) Patent No.: US 12,563,538 B2
(45) Date of Patent: Feb. 24, 2026

(54) METHODS OF COMMUNICATION OF MULTI-RU ALLOCATION

(71) Applicant: SAMSUNG ELECTRONICS CO., LTD., Suwon-si (KR)

(72) Inventors: Myeongjin Kim, Seongnam-si (KR); Wookbong Lee, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 18/335,319

(22) Filed: Jun. 15, 2023

(65) Prior Publication Data

US 2024/0015715 A1     Jan. 11, 2024

Related U.S. Application Data

(63) Continuation of application No. 17/313,232, filed on May 6, 2021, now Pat. No. 12,267,821.

(Continued)

(30) Foreign Application Priority Data

Jan. 22, 2021     (KR) ........................ 10-2021-0009755

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0005* (2013.01); *H04L 5/0008* (2013.01);
(Continued)

(58) Field of Classification Search
CPC ............. H04W 72/0453; H04W 72/23; H04W 74/04; H04W 84/12; H04L 5/0005;
(Continued)

(56) References Cited

U.S. PATENT DOCUMENTS 9,692,629 B2     6/2017 Yang et al.
10,284,287 B2     5/2019 Kim et al.
(Continued)

FOREIGN PATENT DOCUMENTS

CN     106487737 A     3/2017
CN     107925470 A     4/2018
(Continued)

OTHER PUBLICATIONS

Office Action dated Apr. 3, 2024 in correspondence Chinese Patent Application No. 202110528524.2 (in Chinese), 11 pages.
(Continued)

*Primary Examiner* — Omar J Ghowrwal
(74) *Attorney, Agent, or Firm* — Morgan, Lewis & Bockius LLP

(57)     ABSTRACT

A method of communicating, by a first device, with at least one second device in a wireless local area network (WLAN) system includes allocating at least one resource unit (RU) within a bandwidth to a second device; generating at least one subfield defining the at least one RU; generating a trigger frame comprising a user information field comprising the at least one subfield, and transmitting a PPDU including the trigger frame to the at least one second device, wherein the generating comprises setting at least seven bits associated with the at least one RU and setting at least two bits as a value defining a subband that includes the at least one RU when the band width comprises at least four subbands.

12 Claims, 51 Drawing Sheets

Related U.S. Application Data

(60) Provisional application No. 63/118,788, filed on Nov. 27, 2020, provisional application No. 63/109,024, filed on Nov. 3, 2020, provisional application No. 63/106,128, filed on Oct. 27, 2020, provisional application No. 63/094,686, filed on Oct. 21, 2020, provisional application No. 63/089,275, filed on Oct. 8, 2020, provisional application No. 63/073,628, filed on Sep. 2, 2020, provisional application No. 63/025,279, filed on May 15, 2020.

(51) Int. Cl.
*H04W 72/23* (2023.01)
*H04W 74/04* (2009.01)
*H04W 84/12* (2009.01)

(52) U.S. Cl.
CPC .......... *H04L 5/0035* (2013.01); *H04L 5/0037* (2013.01); *H04L 5/0044* (2013.01); *H04L 5/0048* (2013.01); *H04L 5/0055* (2013.01); *H04L 5/0098* (2013.01); *H04W 72/23* (2023.01); *H04W 74/04* (2013.01); *H04W 84/12* (2013.01)

(58) Field of Classification Search
CPC ................. H04L 5/0008; H04L 5/0035; H04L 5/0044; H04L 5/0048; H04L 5/0055; H04L 5/0098; H04L 5/0037
See application file for complete search history.

(56) References Cited

U.S. PATENT DOCUMENTS

| | | | |
|---|---|---|---|
| 10,348,471 | B2 | 7/2019 | Noh et al. |
| 10,362,606 | B2 | 7/2019 | Kim et al. |
| 10,536,797 | B1 | 1/2020 | Sawin et al. |
| 10,536,979 | B2 | 1/2020 | Ko et al. |
| 10,582,025 | B2 | 3/2020 | Josiam et al. |
| 10,582,542 | B2 | 3/2020 | Chitrakar et al. |
| 10,645,687 | B2 | 5/2020 | Xue et al. |
| 11,265,873 | B2 | 3/2022 | Xue et al. |
| 11,523,374 | B2 | 12/2022 | Park et al. |
| 11,737,123 | B2 | 8/2023 | Kim et al. |
| 12,267,821 | B2 * | 4/2025 | Kim ..................... H04W 72/23 |
| 2017/0163394 | A1 * | 6/2017 | Choi ..................... H04L 5/0053 |
| 2018/0302858 | A1 | 10/2018 | Son et al. |
| 2018/0302930 | A1 | 10/2018 | Wang et al. |
| 2019/0116513 | A1 | 4/2019 | Verma et al. |
| 2019/0124556 | A1 | 4/2019 | Verma et al. |
| 2019/0173649 | A1 | 6/2019 | Lin et al. |
| 2019/0238288 | A1 | 8/2019 | Liu et al. |
| 2020/0015219 | A1 | 1/2020 | Asterjadhi et al. |
| 2020/0037342 | A1 | 1/2020 | Seok et al. |
| 2020/0162301 | A1 | 5/2020 | Kilian et al. |
| 2020/0267654 | A1 | 8/2020 | Son et al. |
| 2021/0143966 | A1 | 5/2021 | Yu et al. |
| 2021/0176643 | A1 | 6/2021 | Jang et al. |
| 2021/0360628 | A1 | 11/2021 | Kim et al. |
| 2022/0053465 | A1 | 2/2022 | Redlich et al. |
| 2022/0399970 | A1 | 12/2022 | Kim et al. |
| 2023/0007638 | A1 | 1/2023 | Son et al. |

FOREIGN PATENT DOCUMENTS

| | | |
|---|---|---|
| CN | 108605367 A | 9/2018 |
| CN | 108702375 | 10/2018 |
| CN | 110768757 A | 2/2020 |
| EP | 3396925 A2 | 10/2018 |
| KR | 10-2015-0091370 | 8/2015 |
| KR | 10-2016-0130944 | 11/2016 |
| KR | 10-2018-0086414 | 7/2018 |
| KR | 10-2019-0092452 | 8/2019 |
| KR | 10-2020-0012843 | 2/2020 |
| WO | 2017-011274 | 1/2017 |
| WO | WO2017032343 A1 | 3/2017 |
| WO | WO2019245203 A1 | 12/2019 |
| WO | 2020013594 | 1/2020 |
| WO | 2020019928 | 1/2020 |
| WO | WO2020013594 A1 | 1/2020 |
| WO | 2020-050680 | 3/2020 |
| WO | 2020192715 | 10/2020 |

OTHER PUBLICATIONS

Office Action dated Nov. 8, 2023 in corresponding U.S. Appl. No. 17/313,232.
Final Office Action dated Jul. 27, 2023, in related U.S. Appl. No. 17/313,232.
English translation of WO-2020192715-A1, 2020, Retrieved from PE2E Search on Jul. 17, 2023 (Year: 2020).
Au, "Compendium of straw polls and potential changes to the Specification Framework Document", 297 pages.
Draft Standard for Information technology—Telecommunications and information exchange between systems Local and metropolitan area networks Specific requirements, 784 pages.
European Search Report dated Oct. 13, 2021 in corresponding European Application No. 21173524.6 (16 pages).
Hu, et al., "Multi-RU Indication in Trigger Frame", 14 pages.
Jang, et al. "Discussion on EHT Trigger based UL MU", 13 pages.
Kim et al., "RU Allocation Subfield Design for EHT Trigger Frame", 43 pages.
Shellhammer, et al. "Enhanced Trigger Frame for EHT Support", 35 pages.
Shellhammer, et al., "IEEE 802.11ax Backward Compatible Trigger Frame RU Allocation Table", 25 pages.
Office Action dated Sep. 7, 2023 in corresponding European Patent Application No. 21173524.6 (8 pages).
1 Office Action dated May 8, 2024, in related U.S. Appl. No. 17/313,232.
Extended European Search Report dated Aug. 13, 2025 issued in corresponding European Patent Application No. 25173375.4. (Note: IEEE Draft Standard, WO 2020-013594 A1, WO 2020-019928 A1, US 2020-0015219 A1, US 2019-0124556 A1, US 2019-0238288 A1, WO 2017-011274 A1, WO 2020-050680 A1 already submitted.).

* cited by examiner

FIG. 9B

| RU type | RU index and subcarrier range | | | | |
|---|---|---|---|---|---|
| 26-tone RU | RU 1 [−121:−96] | RU 2 [−95:−70] | RU 3 [−68:−43] | RU 4 [−42:−17] | RU 5 [−16:−4, 4:16] |
| | RU 6 [17:42] | RU 7 [43:68] | RU 8 [70:95] | RU 9 [96:121] | |
| 52-tone RU | RU 1 [−121:−70] | RU 2 [−68:−17] | RU 3 [17:68] | RU 4 [70:121] | |
| 106-tone RU | RU 1 [−122:−17] | | RU 2 [17:122] | | |
| 242-tone RU | RU 1 [−122:−2, 2:122] | | | | |

FIG. 10B

| RU type | RU index and subcarrier range | | | | |
|---|---|---|---|---|---|
| 26-tone RU | RU 1 [−243:−218] | RU 2 [−217:−192] | RU 3 [−189:−164] | RU 4 [−163:−138] | RU 5 [−136:−111] |
| | RU 6 [−109:−84] | RU 7 [−83:−58] | RU 8 [−55:−30] | RU 9 [−29:−4] | |
| | RU 10 [4:29] | RU 11 [30:55] | RU 12 [58:83] | RU 13 [84:109] | RU 14 [111:136] |
| | RU 15 [138:163] | RU 16 [164:189] | RU 17 [192:217] | RU 18 [218:243] | |
| 52-tone RU | RU 1 [−243:−192] | RU 2 [−189:−138] | RU 3 [−109:−58] | RU 4 [−55:−4] | |
| | RU 5 [4:55] | RU 6 [58:109] | RU 7 [138:189] | RU 8 [192:243] | |
| 106-tone RU | RU 1 [−243:−138] | RU 2 [−109:−4] | RU 3 [4:109] | RU 4 [138:243] | |
| 242-tone RU | RU 1 [−244:−3] | | RU 2 [3:244] | | |
| 484-tone RU | RU 1 [−244:−3, 3:244] | | | | |

FIG. 11B

| RU type | RU index and subcarrier range | | | | |
|---|---|---|---|---|---|
| 26-tone RU | RU 1 [−499:−474] | RU 2 [−473:−448] | RU 3 [−445:−420] | RU 4 [−419:−394] | RU 5 [−392:−367] |
| | RU 6 [−365:−340] | RU 7 [−339:−314] | RU 8 [−311:−286] | RU 9 [−285:−260] | |
| | RU 10 [−252:−227] | RU 11 [−226:−201] | RU 12 [−198:−173] | RU 13 [−172:−147] | RU 14 [−145:−120] |
| | RU 15 [−118:−93] | RU 16 [−92:−67] | RU 17 [−64:−39] | RU 18 [−38:−13] | RU 19 [Not defined] |
| | RU 20 [13:38] | RU 21 [39:64] | RU 22 [67:92] | RU 23 [93:118] | RU 24 [120:145] |
| | RU 25 [147:172] | RU 26 [173:198] | RU 27 [201:226] | RU 28 [227:252] | |
| | RU 29 [260:285] | RU 30 [286:311] | RU 31 [314:339] | RU 32 [340:365] | RU 33 [367:392] |
| | RU 34 [394:419] | RU 35 [420:445] | RU 36 [448:473] | RU 37 [474:499] | |
| 52-tone RU | RU 1 [−499:−448] | RU 2 [−445:−394] | RU 3 [−365:−314] | RU 4 [−311:−260] | |
| | RU 5 [−252:−201] | RU 6 [−339:−314] | RU 7 [−118:−67] | RU 8 [−64:−13] | |
| | RU 9 [13:64] | RU 10 [−226:−201] | RU 11 [147:198] | RU 12 [201:252] | |
| | RU 13 [260:311] | RU 14 [−92:−67] | RU 15 [394:445] | RU 16 [448:499] | |
| 106-tone RU | RU 1 [−499:−394] | RU 2 [−365:−260] | RU 3 [−252:−147] | RU 4 [−118:−13] | |
| | RU 5 [13:118] | RU 6 [147:252] | RU 7 [260:365] | RU 8 [394:499] | |
| 242-tone RU | RU 1 [−500:−259] | RU 2 [−253:−12] | RU 3 [12:253] | RU 4 [259:500] | |
| 484-tone RU | RU 1 [−500:−259, −253:−12] | RU 2 [12:253, 259:500] | | | |
| 996-tone RU | RU 1 [−500:−3, 3:500] | | | | |

FIG. 12A

| RU type | RU index and subcarrier range | | | | |
|---|---|---|---|---|---|
| | RU 1 [−1011:−986] | RU 2 [−985:−960] | RU 3 [−957:−932] | RU 4 [−931:−906] | RU 5 [−904:−879] |
| | RU 6 [−877:−852] | RU 7 [−852:−826] | RU 8 [−823:−798] | RU 9 [−797:−772] | |
| | RU 10 [−764:−739] | RU 11 [−738:−713] | RU 12 [−710:−685] | RU 13 [−684:−659] | RU 14 [−657:−632] |
| | RU 15 [−630:−605] | RU 16 [−604:−579] | RU 17 [−576:−551] | RU 18 [−550:−525] | RU 19 [Not defined] |
| | RU 20 [−499:−474] | RU 21 [−473:−448] | RU 22 [−445:−420] | RU 23 [−419:−394] | RU 24 [−392:−367] |
| | RU 25 [−365:−340] | RU 26 [−339:−314] | RU 27 [−311:−286] | RU 28 [−285:−260] | |
| | RU 29 [−252:−227] | RU 30 [−226:−201] | RU 31 [−198:−173] | RU 32 [−172:−147] | RU 33 [−145:−120] |
| 26-tone RU | RU 34 [−118:−93] | RU 35 [−92:−67] | RU 36 [−64:−39] | RU 37 [−38:−13] | |
| | RU 38 [13:38] | RU 39 [39:64] | RU 40 [67:92] | RU 41 [93:118] | RU 42 [120:145] |
| | RU 43 [147:172] | RU 44 [173:198] | RU 45 [201:226] | RU 46 [227:252] | |
| | RU 47 [260:285] | RU 48 [286:311] | RU 49 [314:339] | RU 50 [340:365] | RU 51 [367:392] |
| | RU 52 [394:419] | RU 53 [420:445] | RU 54 [448:473] | RU 55 [474:499] | RU 56 [Not defined] |
| | RU 57 [525:550] | RU 58 [551:576] | RU 59 [579:604] | RU 60 [605:630] | RU 61 [632:657] |
| | RU 62 [659:684] | RU 63 [685:710] | RU 64 [713:738] | RU 65 [739:764] | |
| | RU 66 [772:797] | RU 67 [798:823] | RU 68 [826:851] | RU 69 [852:877] | RU 70 [879:904] |
| | RU 71 [906:931] | RU 72 [932:957] | RU 73 [960:985] | RU 74 [986:1011] | |

FIG. 12B

| RU type | RU index and subcarrier range | | | |
|---|---|---|---|---|
| 52-tone RU | RU 1 [−1011:−960] | RU 2 [−957:−906] | RU 3 [−877:−826] | RU 4 [−823:−772] |
| | RU 5 [−764:−713] | RU 6 [−710:−659] | RU 7 [−630:−579] | RU 8 [−576:−525] |
| | RU 9 [−499:−448] | RU 10 [−445:−394] | RU 11 [−365:−314] | RU 12 [−311:−260] |
| | RU 13 [−252:−201] | RU 14 [−198:−147] | RU 15 [−118:−67] | RU 16 [−64:−13] |
| | RU 17 [13:64] | RU 18 [67:118] | RU 19 [147:198] | RU 20 [201:252] |
| | RU 21 [260:311] | RU 22 [314:365] | RU 23 [394:445] | RU 24 [448:499] |
| | RU 25 [525:576] | RU 26 [579:630] | RU 27 [659:710] | RU 28 [713:764] |
| | RU 29 [772:823] | RU 30 [826:877] | RU 31 [906:957] | RU 32 [980:1011] |
| 52-tone RU | RU 1 [−1011:−906] | RU 2 [−877:−772] | RU 3 [−764:−659] | RU 4 [−630:−525] |
| | RU 5 [−499:−394] | RU 6 [−365:−260] | RU 7 [−252:−147] | RU 8 [−118:−13] |
| | RU 9 [13:118] | RU 10 [147:252] | RU 11 [260:365] | RU 12 [394:499] |
| | RU 13 [525:630] | RU 14 [659:764] | RU 15 [772:877] | RU 16 [906:1011] |
| 242-tone RU | RU 1 [−1012:−771] | RU 2 [−765:−524] | RU 3 [−500:−259] | RU 4 [−253:−12] |
| | RU 5 [12:253] | RU 6 [259:500] | RU 7 [524:765] | RU 8 [771:1012] |
| 484-tone RU | RU 1 [−1012:−771, −765:−524] | RU 2 [−500:−259, −253:−12] | RU 3 [12:253, 259:500] | RU 4 [524:765, 771:1012] |
| 996-tone RU | RU 1 [−1012:−515, −509:−12] | RU 2 [12:509, 515:1012] | | |
| 2x996-tone RU | RU 1 [−1012:−515, −509:−12, 12: 509, 515: 1012] | | | |

FIG. 13A

| RU type | RU index and subcarrier range | | | | |
|---|---|---|---|---|---|
| 26-tone RU | RU 1 [-2035:-2010] | RU 2 [-2009:-1984] | RU 3 [-1981:-1956] | RU 4 [-1955:-1930] | RU 5 [-1928:-1903] |
| | RU 6 [-1901:-1876] | RU 7 [-1875:-1850] | RU 8 [-1847:-1822] | RU 9 [-1821:-1796] | |
| | RU 10 [-1788:-1763] | RU 11 [-1762:-1737] | RU 12 [-1734:-1709] | RU 13 [-1708:-1683] | RU 14 [-1681:-1656] |
| | RU 15 [-1654:-1629] | RU 16 [-1628:-1603] | RU 17 [-1600:-1575] | RU 18 [-1574:-1549] | RU 19 [Not defined] |
| | RU 20 [-1523:-1498] | RU 21 [-1497:-1472] | RU 22 [-1469:-1444] | RU 23 [-1443:-1418] | RU 24 [-1416:-1391] |
| | RU 25 [-1389:-1364] | RU 26 [-1363:-1338] | RU 27 [-1335:-1310] | RU 28 [-1309:-1284] | |
| | RU 29 [-1276:-1251] | RU 30 [-1250:-1225] | RU 31 [-1222:-1197] | RU 32 [-1196:-1171] | RU 33 [-1169:-1144] |
| | RU 34 [-1142:-1117] | RU 35 [-1116:-1091] | RU 36 [-1088:-1063] | RU 37 [-1062:-1037] | |
| | RU 38 [-1011:-986] | RU 39 [-985:-960] | RU 40 [-957:-932] | RU 41 [-931:-906] | RU 42 [-904:-879] |
| | RU 43 [-877:-852] | RU 44 [-851:-826] | RU 45 [-823:-798] | RU 46 [-797:-772] | |
| | RU 47 [-764:-739] | RU 48 [-738:-713] | RU 49 [-710:-685] | RU 50 [-684:-659] | RU 51 [-657:-632] |
| | RU 52 [-630:-605] | RU 53 [-604:-579] | RU 54 [-576:-551] | RU 55 [-550:-525] | RU 56 [Not defined] |
| | RU 57 [-499:-474] | RU 58 [-473:-448] | RU 59 [-445:-420] | RU 60 [-419:-394] | RU 61 [-392:-367] |
| | RU 62 [-365:-340] | RU 63 [-339:-314] | RU 64 [-311:-286] | RU 65 [-285:-260] | |
| | RU 66 [-252:-227] | RU 67 [-226:-201] | RU 68 [-198:-173] | RU 69 [-172:-147] | RU 70 [-145:-120] |
| | RU 71 [-118:-93] | RU 72 [-92:-67] | RU 73 [-64:-39] | RU 74 [-38:-13] | |

FIG. 13B

| RU type | RU index and subcarrier range | | | | |
|---|---|---|---|---|---|
| 26-tone RU | RU 75 [13:38] | RU 76 [39:64] | RU 77 [67:92] | RU 78 [93:118] | RU 79 [120:145] |
| | RU 80 [147:172] | RU 81 [173:198] | RU 82 [201:226] | RU 83 [227:252] | |
| | RU 84 [260:285] | RU 85 [286:311] | RU 86 [314:339] | RU 87 [340:365] | RU 88 [-1681:-1656] |
| | RU 89 [394:419] | RU 90 [420:445] | RU 91 [446:473] | RU 92 [474:499] | RU 93 [Not defined] |
| | RU 94 [525:550] | RU 95 [551:576] | RU 96 [579:604] | RU 97 [605:630] | RU 98 [632:657] |
| | RU 99 [659:684] | RU 100 [685:710] | RU 101 [713:738] | RU 102 [739:764] | |
| | RU 103 [772:797] | RU 104 [798:823] | RU 105 [826:851] | RU 106 [852:877] | RU 107 [879:904] |
| | RU 108 [906:931] | RU 109 [932:957] | RU 110 [960:985] | RU 111 [986:1011] | |
| | RU 112 [1037:1062] | RU 113 [1063:1088] | RU 114 [1091:1116] | RU 115 [1117:1142] | RU 116 [1144:1169] |
| | RU 117 [1171:1196] | RU 118 [1197:1222] | RU 119 [1225:1250] | RU 120 [1251:1276] | |
| | RU 121 [1284:1309] | RU 122 [1310:1335] | RU 123 [1338:1363] | RU 124 [1364:1389] | RU 125 [1391:1416] |
| | RU 126 [1418:1443] | RU 127 [1444:1469] | RU 128 [1472:1497] | RU 129 [1498:1523] | RU 130 [Not defined] |
| | RU 131 [1549:1574] | RU 132 [1575:1600] | RU 133 [1603:1628] | RU 134 [1629:1654] | RU 135 [1656:1681] |
| | RU 136 [1683:1708] | RU 137 [1709:1734] | RU 138 [1737:1762] | RU 139 [1763:1788] | |
| | RU 140 [1796:1821] | RU 141 [1822:1847] | RU 142 [1850:1875] | RU 143 [1876:1901] | RU 144 [1903:1928] |
| | RU 145 [1930:1955] | RU 146 [1956:1981] | RU 147 [1984:2009] | RU 148 [2010:2035] | |

FIG. 13C

| RU type | RU index and subcarrier range | | | |
|---|---|---|---|---|
| 52-tone RU | RU 1<br>[−2035:−1984] | RU 2<br>[−1981:−1930] | RU 3<br>[−1901:−1850] | RU 4<br>[−1847:−1796] |
| | RU 5<br>[−1788:−1737] | RU 6<br>[−1734:−1683] | RU 7<br>[−1654:−1603] | RU 8<br>[−1600:−1549] |
| | RU 9<br>[−1523:−1472] | RU 10<br>[−1469:−1418] | RU 11<br>[−1389:−1338] | RU 12<br>[−1335:−1284] |
| | RU 13<br>[−1276:−1225] | RU 14<br>[−1222:−1171] | RU 15<br>[−1142:−1091] | RU 16<br>[−1088:−1037] |
| | RU 17<br>[−1011:−960] | RU 18<br>[−957:−906] | RU 19<br>[−877:−826] | RU 20<br>[−823:−772] |
| | RU 21<br>[−764:−713] | RU 22<br>[−710:−659] | RU 23<br>[−630:−579] | RU 24<br>[−576:−525] |
| | RU 25<br>[−499:−448] | RU 26<br>[−445:−394] | RU 27<br>[−365:−314] | RU 28<br>[−311:−260] |
| | RU 29<br>[−252:−201] | RU 30<br>[−198:−147] | RU 31<br>[−118:−67] | RU 32<br>[−64:−13] |
| | RU 33<br>[13:64] | RU 34<br>[67:118] | RU 35<br>[147:198] | RU 36<br>[201:252] |
| | RU 37<br>[260:311] | RU 38<br>[314:365] | RU 39<br>[394:445] | RU 40<br>[448:499] |
| | RU 41<br>[525:576] | RU 42<br>[579:630] | RU 43<br>[659:710] | RU 44<br>[713:764] |
| | RU 45<br>[772:823] | RU 46<br>[826:877] | RU 47<br>[906:957] | RU 48<br>[960:1011] |
| | RU 49<br>[1037:1088] | RU 50<br>[1091:1142] | RU 51<br>[1171:1222] | RU 52<br>[1225:1276] |
| | RU 53<br>[1284:1335] | RU 54<br>[1338:1389] | RU 55<br>[1418:1469] | RU 56<br>[1472:1523] |
| | RU 57<br>[1549:1600] | RU 58<br>[1603:1654] | RU 59<br>[1683:1734] | RU 60<br>[1737:1788] |
| | RU 61<br>[1796:1847] | RU 82<br>[1850:1901] | RU 63<br>[1930:1981] | RU 64<br>[1984:2035] |

FIG. 13D

| RU type | RU index and subcarrier range | | | |
|---|---|---|---|---|
| 106-tone RU | RU 1 [−2035:−1930] | RU 2 [−1901:−1796] | RU 3 [−1788:−1683] | RU 4 [−1654:−1549] |
| | RU 5 [−1523:−1418] | RU 6 [−1389:−1284] | RU 7 [−1276:−1171] | RU 8 [−1142:−1037] |
| | RU 9 [−1011:−906] | RU 10 [−877:−772] | RU 11 [−764:−659] | RU 12 [−630:−525] |
| | RU 13 [−499:−394] | RU 14 [−365:−260] | RU 15 [−252:−147] | RU 16 [−118:−13] |
| | RU 17 [13:118] | RU 18 [147:252] | RU 19 [260:365] | RU 20 [394:499] |
| | RU 21 [525:630] | RU 22 [659:764] | RU 23 [772:877] | RU 24 [906:1011] |
| | RU 25 [1037:1142] | RU 26 [1171:1276] | RU 27 [1284:1389] | RU 28 [1418:1523] |
| | RU 29 [1549:1654] | RU 30 [1683:1788] | RU 31 [1796:1901] | RU 32 [1930:2035] |
| 242-tone RU | RU 1 [−2036:−1795] | RU 2 [−1789:−1548] | RU 3 [−1524:−1283] | RU 4 [−1277:−1036] |
| | RU 5 [−1012:−771] | RU 6 [−765:−524] | RU 7 [−500:−259] | RU 8 [−253:−12] |
| | RU 9 [12:253] | RU 10 [259:500] | RU 11 [524:765] | RU 12 [771:1012] |
| | RU 13 [1036:1277] | RU 14 [1283:1524] | RU 15 [1548:1789] | RU 16 [1795:2036] |
| 484-tone RU | RU 1 [−2036:−1795, −765:−524] | RU 2 [−1524:−1283, −1277:−1036] | RU 3 [−1012:−771, −765:−524] | RU 4 [−500:−259, −253:−12] |
| | RU 5 [12:253, 259:500] | RU 6 [524:765, 771:1012] | RU 7 [1036:1277, 1283:1524] | RU 8 [1548:1789, 1795:2036] |
| 996-tone RU | RU 1 [−2036:−1539, −1533:−1036] | RU 2 [−1012:−515, −509:−12] | RU 3 [12:509, 515:1012] | RU 4 [1036:1533, 1539:2036] |

FIG. 13E

| | | | | |
|---|---|---|---|---|
| 2x996-tone RU | RU 1<br>[-2036:-1539,<br>-1533:-1036,<br>-1012:-515,<br>-509:-12] | RU 1<br>[12:509,<br>515:1012,<br>1036:1533,<br>1539:2036] | | |
| 4x996-tone RU | RU 1<br>[-2036:-1539,<br>-1533:-1036,<br>-1012:-515,<br>-509:-12,<br>12:509,<br>515:1012,<br>1036:1533,<br>1539: 2036] | | | |

FIG. 18

| MRU type | MRU index | MRU combination |
|---|---|---|
| 52+26 tone MRU | MRU 1 | 52-tone RU 2 + 26-tone RU 2 |
| | MRU 2 | 52-tone RU 2 + 26-tone RU 5 |
| | MRU 3 | 52-tone RU 3 + 26-tone RU 8 |
| 106+26 tone MRU | MRU 1 | 106-tone RU 1 + 26-tone RU 5 |
| | MRU 2 | 106-tone RU 2 + 26-tone RU 5 |

FIG. 19

| MRU type | MRU index | MRU combination |
|---|---|---|
| 52+26 tone MRU | MRU 1 | 52-tone RU 2 + 26-tone RU 2 |
| | MRU 2 | 52-tone RU 2 + 26-tone RU 5 |
| | MRU 3 | 52-tone RU 3 + 26-tone RU 8 |
| | MRU 4 | 52-tone RU 6 + 26-tone RU 11 |
| | MRU 5 | 52-tone RU 6 + 26-tone RU 14 |
| | MRU 6 | 52-tone RU 7 + 26-tone RU 17 |
| 106+26 tone MRU | MRU 1 | 106-tone RU 1 + 26-tone RU 5 |
| | MRU 2 | 106-tone RU 2 + 26-tone RU 5 |
| | MRU 3 | 106-tone RU 3 + 26-tone RU 14 |
| | MRU 4 | 106-tone RU 4 + 26-tone RU 14 |

FIG. 20

| MRU type | MRU index | MRU combination | Note |
|---|---|---|---|
| 52+26 tone MRU | MRU 1 | 52-tone RU 2 + 26-tone RU 2 | Not supported in BW ≥ 80 MHz |
| | MRU 2 | 52-tone RU 2 + 26-tone RU 5 | -- |
| | MRU 3 | 52-tone RU 3 + 26-tone RU 8 | -- |
| | MRU 4 | 52-tone RU 6 + 26-tone RU 11 | -- |
| | MRU 5 | 52-tone RU 6 + 26-tone RU 14 | -- |
| | MRU 6 | 52-tone RU 7 + 26-tone RU 17 | Not supported in BW ≥ 80 MHz |
| | MRU 7 | 52-tone RU 10 + 26-tone RU 21 | Not supported in BW ≥ 80 MHz |
| | MRU 8 | 52-tone RU 10 + 26-tone RU 24 | -- |
| | MRU 9 | 52-tone RU 11 + 26-tone RU 27 | -- |
| | MRU 10 | 52-tone RU 14 + 26-tone RU 30 | -- |
| | MRU 11 | 52-tone RU 14 + 26-tone RU 33 | -- |
| | MRU 12 | 52-tone RU 15 + 26-tone RU 36 | Not supported in BW ≥ 80 MHz |
| 106+26 tone MRU | MRU 1 | 106-tone RU 1 + 26-tone RU 5 | -- |
| | MRU 2 | 106-tone RU 2 + 26-tone RU 5 | Not supported in BW ≥ 80 MHz |
| | MRU 3 | 106-tone RU 3 + 26-tone RU 14 | Not supported in BW ≥ 80 MHz |
| | MRU 4 | 106-tone RU 4 + 26-tone RU 14 | -- |
| | MRU 5 | 106-tone RU 5 + 26-tone RU 24 | -- |
| | MRU 6 | 106-tone RU 6 + 26-tone RU 24 | Not supported in BW ≥ 80 MHz |
| | MRU 7 | 106-tone RU 7 + 26-tone RU 33 | Not supported in BW ≥ 80 MHz |
| | MRU 8 | 106-tone RU 8 + 26-tone RU 33 | -- |

FIG. 21A

| MRU type | MRU index | MRU combination | Note |
|---|---|---|---|
| 52+26 tone MRU | MRU 1 | 52-tone RU 2 + 26-tone RU 2 | Not supported in BW ≥ 80 MHz |
| | MRU 2 | 52-tone RU 2 + 26-tone RU 5 | -- |
| | MRU 3 | 52-tone RU 3 + 26-tone RU 8 | -- |
| | MRU 4 | 52-tone RU 6 + 26-tone RU 11 | -- |
| | MRU 5 | 52-tone RU 6 + 26-tone RU 14 | -- |
| | MRU 6 | 52-tone RU 7 + 26-tone RU 17 | Not supported in BW ≥ 80 MHz |
| | MRU 7 | 52-tone RU 10 + 26-tone RU 21 | Not supported in BW ≥ 80 MHz |
| | MRU 8 | 52-tone RU 10 + 26-tone RU 24 | -- |
| | MRU 9 | 52-tone RU 11 + 26-tone RU 27 | -- |
| | MRU 10 | 52-tone RU 14 + 26-tone RU 30 | -- |
| | MRU 11 | 52-tone RU 14 + 26-tone RU 33 | -- |
| | MRU 12 | 52-tone RU 15 + 26-tone RU 36 | Not supported in BW ≥ 80 MHz |
| | MRU 13 | 52-tone RU 18 + 26-tone RU 39 | Not supported in BW ≥ 80 MHz |
| | MRU 14 | 52-tone RU 18 + 26-tone RU 42 | -- |
| | MRU 15 | 52-tone RU 19 + 26-tone RU 45 | -- |
| | MRU 16 | 52-tone RU 22 + 26-tone RU 48 | -- |
| | MRU 17 | 52-tone RU 22 + 26-tone RU 51 | -- |
| | MRU 18 | 52-tone RU 23 + 26-tone RU 54 | Not supported in BW ≥ 80 MHz |
| | MRU 19 | 52-tone RU 26 + 26-tone RU 58 | Not supported in BW ≥ 80 MHz |
| | MRU 20 | 52-tone RU 26 + 26-tone RU 61 | -- |
| | MRU 21 | 52-tone RU 27 + 26-tone RU 64 | -- |
| | MRU 22 | 52-tone RU 30 + 26-tone RU 67 | -- |
| | MRU 23 | 52-tone RU 30 + 26-tone RU 70 | -- |
| | MRU 24 | 52-tone RU 31 + 26-tone RU 73 | Not supported in BW ≥ 80 MHz |

FIG. 21B

| MRU type | MRU index | MRU combination | Note |
|---|---|---|---|
| 106+26 tone MRU | MRU 1 | 106-tone RU 1 + 26-tone RU 5 | – |
| | MRU 2 | 106-tone RU 2 + 26-tone RU 5 | Not supported in BW ≥ 80 MHz |
| | MRU 3 | 106-tone RU 3 + 26-tone RU 14 | Not supported in BW ≥ 80 MHz |
| | MRU 4 | 106-tone RU 4 + 26-tone RU 14 | – |
| | MRU 5 | 106-tone RU 5 + 26-tone RU 24 | – |
| | MRU 6 | 106-tone RU 6 + 26-tone RU 24 | Not supported in BW ≥ 80 MHz |
| | MRU 7 | 106-tone RU 7 + 26-tone RU 33 | Not supported in BW ≥ 80 MHz |
| | MRU 8 | 106-tone RU 8 + 26-tone RU 33 | – |
| | MRU 9 | 106-tone RU 9 + 26-tone RU 42 | – |
| | MRU 10 | 106-tone RU 10 + 26-tone RU 42 | Not supported in BW ≥ 80 MHz |
| | MRU 11 | 106-tone RU 11 + 26-tone RU 51 | Not supported in BW ≥ 80 MHz |
| | MRU 12 | 106-tone RU 12 + 26-tone RU 51 | – |
| | MRU 13 | 106-tone RU 13 + 26-tone RU 61 | – |
| | MRU 14 | 106-tone RU 14 + 26-tone RU 61 | Not supported in BW ≥ 80 MHz |
| | MRU 15 | 106-tone RU 15 + 26-tone RU 70 | Not supported in BW ≥ 80 MHz |
| | MRU 16 | 106-tone RU 16 + 26-tone RU 70 | – |

FIG.  22A

| MRU type | MRU index | MRU combination | Note |
|---|---|---|---|
| 52+26 tone MRU | MRU 1 | 52-tone RU 2 + 26-tone RU 2 | Not supported in BW ≥ 80 MHz |
| | MRU 2 | 52-tone RU 2 + 26-tone RU 5 | -- |
| | MRU 3 | 52-tone RU 3 + 26-tone RU 8 | -- |
| | MRU 4 | 52-tone RU 6 + 26-tone RU 11 | -- |
| | MRU 5 | 52-tone RU 6 + 26-tone RU 14 | -- |
| | MRU 6 | 52-tone RU 7 + 26-tone RU 17 | Not supported in BW ≥ 80 MHz |
| | MRU 7 | 52-tone RU 10 + 26-tone RU 21 | Not supported in BW ≥ 80 MHz |
| | MRU 8 | 52-tone RU 10 + 26-tone RU 24 | -- |
| | MRU 9 | 52-tone RU 11 + 26-tone RU 27 | -- |
| | MRU 10 | 52-tone RU 14 + 26-tone RU 30 | -- |
| | MRU 11 | 52-tone RU 14 + 26-tone RU 33 | -- |
| | MRU 12 | 52-tone RU 15 + 26-tone RU 36 | Not supported in BW ≥ 80 MHz |
| | MRU 13 | 52-tone RU 18 + 26-tone RU 39 | Not supported in BW ≥ 80 MHz |
| | MRU 14 | 52-tone RU 18 + 26-tone RU 42 | -- |
| | MRU 15 | 52-tone RU 19 + 26-tone RU 45 | -- |
| | MRU 16 | 52-tone RU 22 + 26-tone RU 48 | -- |
| | MRU 17 | 52-tone RU 22 + 26-tone RU 51 | -- |
| | MRU 18 | 52-tone RU 23 + 26-tone RU 54 | Not supported in BW ≥ 80 MHz |
| | MRU 19 | 52-tone RU 26 + 26-tone RU 58 | Not supported in BW ≥ 80 MHz |
| | MRU 20 | 52-tone RU 26 + 26-tone RU 61 | -- |
| | MRU 21 | 52-tone RU 27 + 26-tone RU 64 | -- |
| | MRU 22 | 52-tone RU 30 + 26-tone RU 67 | -- |
| | MRU 23 | 52-tone RU 30 + 26-tone RU 70 | -- |
| | MRU 24 | 52-tone RU 31 + 26-tone RU 73 | Not supported in BW ≥ 80 MHz |

FIG. 22B

| MRU type | MRU index | MRU combination | Note |
|---|---|---|---|
| 52+26 tone MRU | MRU 25 | 52-tone RU 34 + 26-tone RU 76 | Not supported in BW ≥ 80 MHz |
| | MRU 26 | 52-tone RU 34 + 26-tone RU 79 | -- |
| | MRU 27 | 52-tone RU 37 + 26-tone RU 82 | -- |
| | MRU 28 | 52-tone RU 38 + 26-tone RU 85 | -- |
| | MRU 29 | 52-tone RU 38 + 26-tone RU 88 | -- |
| | MRU 30 | 52-tone RU 39 + 26-tone RU 91 | Not supported in BW ≥ 80 MHz |
| | MRU 31 | 52-tone RU 42 + 26-tone RU 95 | Not supported in BW ≥ 80 MHz |
| | MRU 32 | 52-tone RU 42 + 26-tone RU 98 | -- |
| | MRU 33 | 52-tone RU 43 + 26-tone RU 101 | -- |
| | MRU 34 | 52-tone RU 46 + 26-tone RU 104 | -- |
| | MRU 35 | 52-tone RU 46 + 26-tone RU 107 | -- |
| | MRU 36 | 52-tone RU 47 + 26-tone RU 110 | Not supported in BW ≥ 80 MHz |
| | MRU 37 | 52-tone RU 50 + 26-tone RU 113 | Not supported in BW ≥ 80 MHz |
| | MRU 38 | 52-tone RU 50 + 26-tone RU 116 | -- |
| | MRU 39 | 52-tone RU 51 + 26-tone RU 119 | -- |
| | MRU 40 | 52-tone RU 54 + 26-tone RU 122 | -- |
| | MRU 41 | 52-tone RU 54 + 26-tone RU 125 | -- |
| | MRU 42 | 52-tone RU 55 + 26-tone RU 128 | Not supported in BW ≥ 80 MHz |
| | MRU 43 | 52-tone RU 58 + 26-tone RU 132 | Not supported in BW ≥ 80 MHz |
| | MRU 44 | 52-tone RU 58 + 26-tone RU 135 | -- |
| | MRU 45 | 52-tone RU 59 + 26-tone RU 138 | -- |
| | MRU 46 | 52-tone RU 62 + 26-tone RU 141 | -- |
| | MRU 47 | 52-tone RU 62 + 26-tone RU 144 | -- |
| | MRU 48 | 52-tone RU 63 + 26-tone RU 147 | Not supported in BW ≥ 80 MHz |

FIG. 22C

| MRU type | MRU index | MRU combination | Note |
|---|---|---|---|
| 106+26 tone MRU | MRU 1 | 106-tone RU 1 + 26-tone RU 5 | -- |
| | MRU 2 | 106-tone RU 2 + 26-tone RU 5 | Not supported in BW ≥ 80 MHz |
| | MRU 3 | 106-tone RU 3 + 26-tone RU 14 | Not supported in BW ≥ 80 MHz |
| | MRU 4 | 106-tone RU 4 + 26-tone RU 14 | -- |
| | MRU 5 | 106-tone RU 5 + 26-tone RU 24 | -- |
| | MRU 6 | 106-tone RU 6 + 26-tone RU 24 | Not supported in BW ≥ 80 MHz |
| | MRU 7 | 106-tone RU 7 + 26-tone RU 33 | Not supported in BW ≥ 80 MHz |
| | MRU 8 | 106-tone RU 8 + 26-tone RU 33 | -- |
| | MRU 9 | 106-tone RU 9 + 26-tone RU 42 | -- |
| | MRU 10 | 106-tone RU 10 + 26-tone RU 42 | Not supported in BW ≥ 80 MHz |
| | MRU 11 | 106-tone RU 11 + 26-tone RU 51 | Not supported in BW ≥ 80 MHz |
| | MRU 12 | 106-tone RU 12 + 26-tone RU 51 | -- |
| | MRU 13 | 106-tone RU 13 + 26-tone RU 61 | -- |
| | MRU 14 | 106-tone RU 14 + 26-tone RU 61 | Not supported in BW ≥ 80 MHz |
| | MRU 15 | 106-tone RU 15 + 26-tone RU 70 | Not supported in BW ≥ 80 MHz |
| | MRU 16 | 106-tone RU 16 + 26-tone RU 70 | -- |
| | MRU 17 | 106-tone RU 17 + 26-tone RU 79 | -- |
| | MRU 18 | 106-tone RU 18+ 26-tone RU 79 | Not supported in BW ≥ 80 MHz |
| | MRU 19 | 106-tone RU 19+ 26-tone RU 88 | Not supported in BW ≥ 80 MHz |
| | MRU 20 | 106-tone RU 20 + 26-tone RU 88 | -- |
| | MRU 21 | 106-tone RU 21 + 26-tone RU 98 | -- |
| | MRU 22 | 106-tone RU 22 + 26-tone RU 98 | Not supported in BW ≥ 80 MHz |
| | MRU 23 | 106-tone RU 23 + 26-tone RU 107 | Not supported in BW ≥ 80 MHz |
| | MRU 24 | 106-tone RU 24 + 26-tone RU 107 | -- |
| | MRU 25 | 106-tone RU 25 + 26-tone RU 116 | -- |
| | MRU 26 | 106-tone RU 26 + 26-tone RU 116 | Not supported in BW ≥ 80 MHz |
| | MRU 27 | 106-tone RU 27 + 26-tone RU 125 | Not supported in BW ≥ 80 MHz |
| | MRU 28 | 106-tone RU 28 + 26-tone RU 125 | -- |
| | MRU 29 | 106-tone RU 29 + 26-tone RU 135 | -- |
| | MRU 30 | 106-tone RU 30 + 26-tone RU 135 | Not supported in BW ≥ 80 MHz |
| | MRU 31 | 106-tone RU 31 + 26-tone RU 144 | Not supported in BW ≥ 80 MHz |
| | MRU 32 | 106-tone RU 32 + 26-tone RU 144 | -- |

FIG. 23

| MRU type | MRU index | MRU combination |
|---|---|---|
| 484+242 tone MRU | MRU 1 | 484+242 tone MRU; [empty-RU242 RU242 RU484] |
| | MRU 2 | 484+242 tone MRU; [RU242 empty-RU242 RU484] |
| | MRU 3 | 484+242 tone MRU; [RU484 empty-RU242 RU242] |
| | MRU 4 | 484+242 tone MRU; [RU484 RU242 empty-RU242] |

FIG. 24

| MRU type | MRU index | MRU combination |
|---|---|---|
| RU484 +RU242 | MRU 1 | RU484+RU242; [empty-RU242 RU242 RU484] in lower 80MHz channel |
| | MRU 2 | RU484+RU242; [RU242 empty-RU242 RU484] in lower 80MHz channel |
| | MRU 3 | RU484+RU242; [RU484 empty-RU242 RU242] in lower 80MHz channel |
| | MRU 4 | RU484+RU242; [RU484 RU242 empty-RU242] in lower 80MHz channel |
| | MRU 5 | RU484+RU242; [empty-RU242 RU242 RU484] in upper 80MHz channel |
| | MRU 6 | RU484+RU242; [RU242 empty-RU242 RU484] in upper 80MHz channel |
| | MRU 7 | RU484+RU242; [RU484 empty-RU242 RU242] in upper 80MHz channel |
| | MRU 8 | RU484+RU242; [RU484 RU242 empty-RU242] in upper 80MHz channel |
| RU996+RU484 | MRU 1 | RU996+RU484; [empty-RU484 RU484 RU996] |
| | MRU 2 | RU996+RU484; [RU484 empty-RU484 RU996] |
| | MRU 3 | RU996+RU484; [RU996 empty-RU484 RU484] |
| | MRU 4 | RU996+RU484; [RU996 RU484 empty-RU484] |
| RU996 +RU484 +RU242 (Only for Non -OFDMA) | MRU 1 | RU996+RU484+RU242; [empty-RU242 RU242 RU484 RU996] |
| | MRU 2 | RU996+RU484+RU242; [RU242 empty-RU242 RU484 RU996] |
| | MRU 3 | RU996+RU484+RU242; [RU484 empty-RU242 RU242 RU996] |
| | MRU 4 | RU996+RU484+RU242; [RU484 RU242 empty-RU242 RU996] |
| | MRU 5 | RU996+RU484+RU242; [RU996 empty-RU242 RU242 RU484] |
| | MRU 6 | RU996+RU484+RU242; [RU996 RU242 empty-RU242 RU484] |
| | MRU 7 | RU996+RU484+RU242; [RU996 RU484 empty-RU242 RU242] |
| | MRU 8 | RU996+RU484+RU242; [RU996 RU484 RU242 empty-RU242] |

FIG. 25A

| MRU type | MRU index | MRU combination |
|---|---|---|
| RU484+RU242 | MRU 1 | RU484+RU242; [empty-RU242 RU242 RU484] in lower 80MHz channel in lower 160MHz |
| | MRU 2 | RU484+RU242; [RU242 empty-RU242 RU484] in lower 80MHz channel in lower 160MHz |
| | MRU 3 | RU484+RU242; [RU484 empty-RU242 RU242] in lower 80MHz channel in lower 160MHz |
| | MRU 4 | RU484+RU242; [RU484 RU242 empty-RU242] in lower 80MHz channel in lower 160MHz |
| | MRU 5 | RU484+RU242; [empty-RU242 RU242 RU484] in upper 80MHz channel in lower 160MHz |
| | MRU 6 | RU484+RU242; [RU242 empty-RU242 RU484] in upper 80MHz channel in lower 160MHz |
| | MRU 7 | RU484+RU242; [RU484 empty-RU242 RU242] in upper 80MHz channel in lower 160MHz |
| | MRU 8 | RU484+RU242; [RU484 RU242 empty-RU242] in upper 80MHz channel in lower 160MHz |
| | MRU 9 | RU484+RU242; [empty-RU242 RU242 RU484] in lower 80MHz channel in upper 160MHz |
| | MRU 10 | RU484+RU242; [RU242 empty-RU242 RU484] in lower 80MHz channel in upper 160MHz |
| | MRU 11 | RU484+RU242; [RU484 empty-RU242 RU242] in lower 80MHz channel in upper 160MHz |
| | MRU 12 | RU484+RU242; [RU484 RU242 empty-RU242] in lower 80MHz channel in upper 160MHz |
| | MRU 13 | RU484+RU242; [empty-RU242 RU242 RU484] in upper 80MHz channel in upper 160MHz |
| | MRU 14 | RU484+RU242; [RU242 empty-RU242 RU484] in upper 80MHz channel in upper 160MHz |
| | MRU 15 | RU484+RU242; [RU484 empty-RU242 RU242] in upper 80MHz channel in upper 160MHz |
| | MRU 16 | RU484+RU242; [RU484 RU242 empty-RU242] in upper 80MHz channel in upper 160MHz |
| RU996 +RU484 | MRU 1 | RU996+RU484; [empty-RU484 RU484 RU996] in lower 160MHz |
| | MRU 2 | RU996+RU484; [RU484 empty-RU484 RU996] in lower 160MHz |
| | MRU 3 | RU996+RU484; [RU996 empty-RU484 RU484] in lower 160MHz |
| | MRU 4 | RU996+RU484; [RU996 RU484 empty-RU484] in lower 160MHz |
| | MRU 5 | RU996+RU484; [empty-RU484 RU484 RU996] in upper 160MHz |
| | MRU 6 | RU996+RU484; [RU484 empty-RU484 RU996] in upper 160MHz |
| | MRU 7 | RU996+RU484; [RU996 empty-RU484 RU484] in upper 160MHz |
| | MRU 8 | RU996+RU484; [RU996 RU484 empty-RU484] in upper 160MHz |

FIG. 25B

| MRU type | MRU index | MRU combination |
|---|---|---|
| RU996 +RU484 +RU242 (Only for non-OFDMA) | MRU 1 | RU996+RU484+RU242; [empty-RU242 RU242 RU484 RU996] in lower 160MHz |
| | MRU 2 | RU996+RU484+RU242; [RU242 empty-RU242 RU484 RU996] in lower 160MHz |
| | MRU 3 | RU996+RU484+RU242; [RU484 empty-RU242 RU242 RU996] in lower 160MHz |
| | MRU 4 | RU996+RU484+RU242; [RU484 RU242 empty-RU242 RU996] in lower 160MHz |
| | MRU 5 | RU996+RU484+RU242; [RU996 empty-RU242 RU242 RU484] in lower 160MHz |
| | MRU 6 | RU996+RU484+RU242; [RU996 RU242 empty-RU242 RU484] in lower 160MHz |
| | MRU 7 | RU996+RU484+RU242; [RU996 RU484 empty-RU242 RU242] in lower 160MHz |
| | MRU 8 | RU996+RU484+RU242; [RU996 RU484 RU242 empty-RU242] in lower 160MHz |
| | MRU 9 | RU996+RU484+RU242; [empty-RU242 RU242 RU484 RU996] in upper 160MHz |
| | MRU 10 | RU996+RU484+RU242; [RU242 empty-RU242 RU484 RU996] in upper 160MHz |
| | MRU 11 | RU996+RU484+RU242; [RU484 empty-RU242 RU242 RU996] in upper 160MHz |
| | MRU 12 | RU996+RU484+RU242; [RU484 RU242 empty-RU242 RU996] in upper 160MHz |
| | MRU 13 | RU996+RU484+RU242; [RU996 empty-RU242 RU242 RU484] in upper 160MHz |
| | MRU 14 | RU996+RU484+RU242; [RU996 RU242 empty-RU242 RU484] in upper 160MHz |
| | MRU 15 | RU996+RU484+RU242; [RU996 RU484 empty-RU242 RU242] in upper 160MHz |
| | MRU 16 | RU996+RU484+RU242; [RU996 RU484 RU242 empty-RU242] in upper 160MHz |
| 2×RU996 +RU484 | MRU 1 | 2×RU996+RU484; [empty-RU484 RU484 RU996 RU996 empty-RU996] |
| | MRU 2 | 2×RU996+RU484; [RU484 empty-RU484 RU996 RU996 empty-RU996] |
| | MRU 3 | 2×RU996+RU484; [RU996 empty-RU484 RU484 RU996 empty-RU996] |
| | MRU 4 | 2×RU996+RU484; [RU996 RU484 empty-RU484 RU996 empty-RU996] |
| | MRU 5 | 2×RU996+RU484; [RU996 RU996 empty-RU484 RU484 empty-RU996] |
| | MRU 6 | 2×RU996+RU484; [RU996 RU996 RU484 empty-RU484 empty-RU996] |
| | MRU 7 | 2×RU996+RU484; [empty-RU996 empty-RU484 RU484 RU996 RU996] |
| | MRU 8 | 2×RU996+RU484; [empty-RU996 RU484 empty-RU484 RU996 RU996] |
| | MRU 9 | 2×RU996+RU484; [empty-RU996 RU996 empty-RU484 RU484 RU996] |
| | MRU 10 | 2×RU996+RU484; [empty-RU996 RU996 RU484 empty-RU484 RU996] |
| | MRU 11 | 2×RU996+RU484; [empty-RU996 RU996 RU996 empty-RU484 RU484] |
| | MRU 12 | 2×RU996+RU484; [empty-RU996 RU996 RU996 RU484 empty-RU484] |

FIG. 25C

| MRU type | MRU index | MRU combination |
|---|---|---|
| 3×RU996 | MRU 1 | 3×RU996; [empty-RU996 RU996 RU996 RU996] |
| | MRU 2 | 3×RU996; [RU996 empty-RU996 RU996 RU996] |
| | MRU 3 | 3×RU996; [RU996 RU996 empty-RU996 RU996] |
| | MRU 4 | 3×RU996; [RU996 RU996 RU996 empty-RU996] |
| 3×RU996 +RU484 | MRU 1 | 3×RU996+RU484; [empty-RU484 RU484 RU996 RU996 RU996] |
| | MRU 2 | 3×RU996+RU484; [RU484 empty-RU484 RU996 RU996 RU996] |
| | MRU 3 | 3×RU996+RU484; [RU996 empty-RU484 RU484 RU996 RU996] |
| | MRU 4 | 3×RU996+RU484; [RU996 RU996 empty-RU484 RU996 RU996] |
| | MRU 5 | 3×RU996+RU484; [RU996 RU996 empty-RU484 RU996 RU996] |
| | MRU 6 | 3×RU996+RU484; [RU996 RU996 RU484 empty-RU484 RU996] |
| | MRU 7 | 3×RU996+RU484; [RU996 RU996 RU996 empty-RU484 RU484] |
| | MRU 8 | 3×RU996+RU484; [RU996 RU996 RU996 RU484 empty-RU484] |

Figure 27:
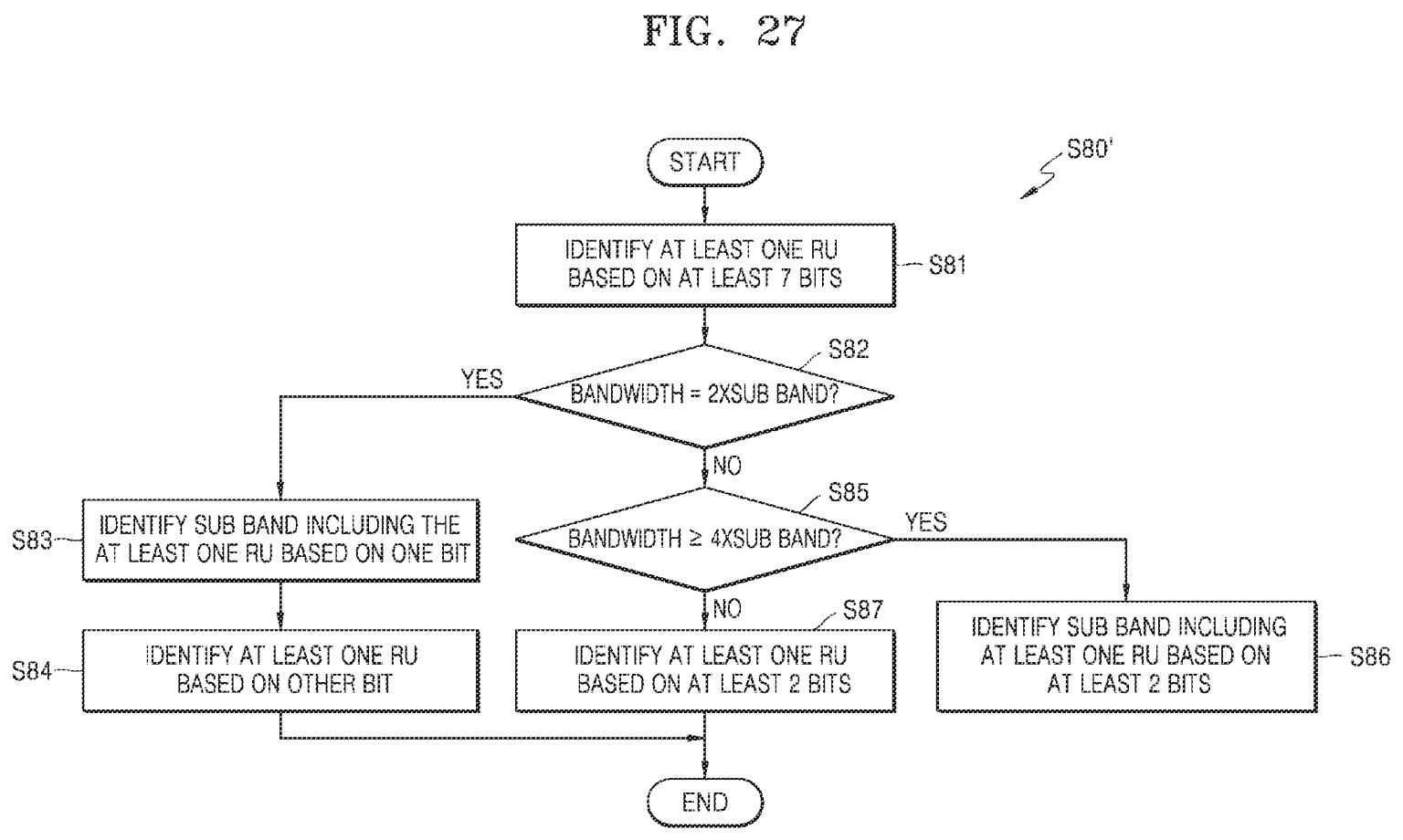

START

IDENTIFY AT LEAST ONE RU BASED ON AT LEAST 7 BITS — S81

BANDWIDTH = 2XSUB BAND? — S82

YES → IDENTIFY SUB BAND INCLUDING THE AT LEAST ONE RU BASED ON ONE BIT — S83

IDENTIFY AT LEAST ONE RU BASED ON OTHER BIT — S84

NO → BANDWIDTH ≥ 4XSUB BAND? — S85

YES → IDENTIFY SUB BAND INCLUDING AT LEAST ONE RU BASED ON AT LEAST 2 BITS — S86

NO → IDENTIFY AT LEAST ONE RU BASED ON AT LEAST 2 BITS — S87

END

FIG. 28A

RU Allocation Subfield | X8 | X7 | X6 | X5 | X4 | X3 | X2 | X1 | X0 |

T1

| UL Bandwidth | [X0 X1] | | | |
| --- | --- | --- | --- | --- |
| | Lower 160MHz | | Upper 160MHz | |
| | Lower 80MHz | Upper 80MHz | Lower 80MHz | Upper 80MHz |
| 160MHz | [0 0] | [0 1] | -- | -- |
| 320 MHz | [0 0] | [0 1] | [1 0] | [1 1] |

T2

| 320MHz Channelization | [X0 X1] | | | |
| --- | --- | --- | --- | --- |
| | Primary 160MHz | | Secondary 160MHz | |
| | Primary 80MHz | Secondary 80MHz | Lower 80MHz | Upper 80MHz |
| [P80 S80 S160] | [0 0] | [0 1] | [1 0] | [1 1] |
| [S80 P80 S160] | [0 1] | [0 0] | [1 0] | [1 1] |
| [S160 P80 S80] | [1 0] | [1 1] | [0 0] | [0 1] |
| [S160 S80 P80] | [1 1] | [1 0] | [0 0] | [0 1] |

T3

| 160MHz Channelization | Primary 80MHz | Secondary 80MHz |
| --- | --- | --- |
| [P80 S80] | X1 = 0 | X1 = 1 |
| [S80 P80] | X1 = 1 | X1 = 0 |

FIG. 29A

| X8-X2 of RU Allocation subfield | UL Bandwidth | RU/MRU size | RU/MRU Index |
|---|---|---|---|
| 0-8 | 20 MHz, 40 MHz, 80 MHz, 160 MHz, 320 MHz | RU26 | RU 37×N+1 to RU 37×N+9, respectively |
| 9-17 | 40 MHz, 80 MHz, 160 MHz, 320 MHz | | RU 37×N+10 to RU 37×N+18, respectively |
| 18 | -- | | RU 37×N+19 (Note defined in 11be.) |
| 19-36 | 80 MHz, 160 MHz, 320 MHz | | RU 37×N+20 to RU 37×N+37, respectively |
| 37-40 | 20 MHz, 40 MHz, 80 MHz, 160 MHz, 320 MHz | RU52 | RU 16×N+1 to RU 16×N+4, respectively |
| 41-44 | 40 MHz, 80 MHz, 160 MHz, 320 MHz | | RU 16×N+5 to RU 16×N+8, respectively |
| 45-52 | 80 MHz, 160 MHz, 320 MHz | | RU 16×N+9 to RU 16×N+16, respectively |
| 53, 54 | 20 MHz, 40 MHz, 80 MHz, 160 MHz, 320 MHz | RU106 | RU 8×N+1 and RU 8×N+2, respectively |
| 55, 56 | 40 MHz, 80 MHz, 160 MHz, 320 MHz | | RU 8×N+3 and RU 8×N+4, respectively |
| 57-60 | 80 MHz, 160 MHz, 320 MHz | | RU 8×N+5 to RU 8×N+8, respectively |
| 61 | 20 MHz, 40 MHz, 80 MHz, 160 MHz, 320 MHz | RU242 | RU 4×N+1 |
| 72 | 40 MHz, 80 MHz, 160 MHz, 320 MHz | | RU 4×N+2 |
| 63, 64 | 80 MHz, 160 MHz, 320 MHz | | RU 4×N+3 and RU 4×N+4, respectively |
| 65 | 40 MHz, 80 MHz, 160 MHz, 320 MHz | RU484 | RU 2×N+1 |
| 66 | 80 MHz, 160 MHz, 320 MHz | | RU 2×N+2 |
| 67 | 80 MHz, 160 MHz, 320 MHz | RU996 | RU N+1 |
| 68 | 160 MHz, 320 MHz | 2×RU996 | RU X0+1 |
| 69 | 320 MHz | 4×RU996 | RU1 |
| 70-72 | 20MHz, 40MHz, 80MHz, 160MHz, 320MHz | RU52+RU26 | MRU 12×N+1 to MRU 12×N+3, respectively |
| 73-75 | 40 MHz, 80 MHz, 160 MHz, 320 MHz | | MRU 12×N+4 to MRU 12×N+6, respectively |
| 76-81 | 80 MHz, 160 MHz, 320 MHz | | MRU 12×N+7 to MRU 12×N+12, respectively |
| 82,83 | 20 MHz, 40 MHz, 80 MHz, 160 MHz, 320 MHz | RU106+RU26 | MRU 8×N+1 and MRU 8×N+2, respectively |
| 84,85 | 40 MHz, 80 MHz, 160 MHz, 320 MHz | | MRU 8×N+3 and MRU 8×N+4, respectively |
| 86-89 | 80 MHz, 160 MHz, 320 MHz | | MRU 8×N+5 to MRU 8×N+8, respectively |
| 90-93 | 80 MHz, 160 MHz, 320 MHz | RU484+RU242 | MRU 4×N+1 to MRU 4×N+4, respectively |

-[X0 X1] are used to indicate the location of channel that RU or MRU allocation applies.
-For UL BW ≤ 80MHz, N=0. For UL BW = 160MHz, N=X1. For UL BW = 320MHz, N=2×X0+X1.

FIG. 29B

| X8-X2 | | | UL Bandwidth | MRU size | MRU size Index |
|---|---|---|---|---|---|
| X0 | X1 | X8-X2 | | | |
| [X0] Indicates a lower 160MHz or a higher 160MHz. | 0 | 94 | 160 MHz, 320 MHz | RU996 +RU484 | 4×X0+1 |
| | 0 | 95 | | | 4×X0+2 |
| | 1 | 94 | 160 MHz, 320 MHz | RU996 +RU484 | 4×X0+3 |
| | 1 | 95 | | | 4×X0+4 |
| | 0 | 96 | 160 MHz, 320 MHz | RU996 + RU484 +RU242 | 8×X0+1 |
| | 0 | 97 | | | 8×X0+2 |
| | 0 | 98 | | | 8×X0+3 |
| | 0 | 99 | | | 8×X0+4 |
| | 1 | 96 | | | 8×X0+5 |
| | 1 | 97 | | | 8×X0+6 |
| | 1 | 98 | | | 8×X0+7 |
| | 1 | 99 | | | 8×X0+8 |
| 0 | 0 | 100 | 320 MHz | 2×RU996 +RU484 | 1 |
| 0 | 0 | 101 | | | 2 |
| 0 | 0 | 102 | | | 3 |
| 0 | 0 | 103 | | | 4 |
| 0 | 1 | 100 | | | 5 |
| 0 | 1 | 101 | | | 6 |
| 1 | 0 | 100 | | | 7 |
| 1 | 0 | 101 | | | 8 |
| 1 | 0 | 102 | | | 9 |
| 1 | 0 | 103 | | | 10 |
| 1 | 1 | 100 | | | 11 |
| 1 | 1 | 101 | | | 12 |
| 0 | 0 | 104 | 320 MHz | 3×RU996 | 1 |
| 0 | 1 | 104 | | | 2 |
| 1 | 0 | 104 | | | 3 |
| 1 | 1 | 104 | | | 4 |
| 0 | 0 | 105 | 320 MHz | 3×RU996 +RU484 | 1 |
| 0 | 0 | 106 | | | 2 |
| 0 | 0 | 105 | | | 3 |
| 0 | 0 | 106 | | | 4 |
| 1 | 1 | 105 | | | 5 |
| 1 | 0 | 106 | | | 6 |
| 1 | 1 | 105 | | | 7 |
| 1 | 1 | 106 | | | 8 |

FIG. 30

| RU Allocation Subfield | | | Location of Punctured RU484 in 160MHz [X1 X2] | MRU index | RU996+RU484 |
|---|---|---|---|---|---|
| X0 | X1 | X8~X2 | | | |
| | 0 | 94 | [0 0] (0) | 2×N+1 | RU484 / RU484 / RU996 |
| [X0] indicates a lower 160MHz or a higher 160MHz | 0 | 95 | [0 1] (1) | 2×N+2 | RU484 / RU484 / RU996 |
| | 1 | 94 | [1 0] (2) | 2×N+1 | RU996 / RU484 / RU484 |
| | 1 | 95 | [1 1] (3) | 2×N+2 | RU996 / RU484 / RU484 |

- For UL BW = 160MHz, N=X1. For UL BW = 320MHz, N=2×X0+X1

FIG. 31

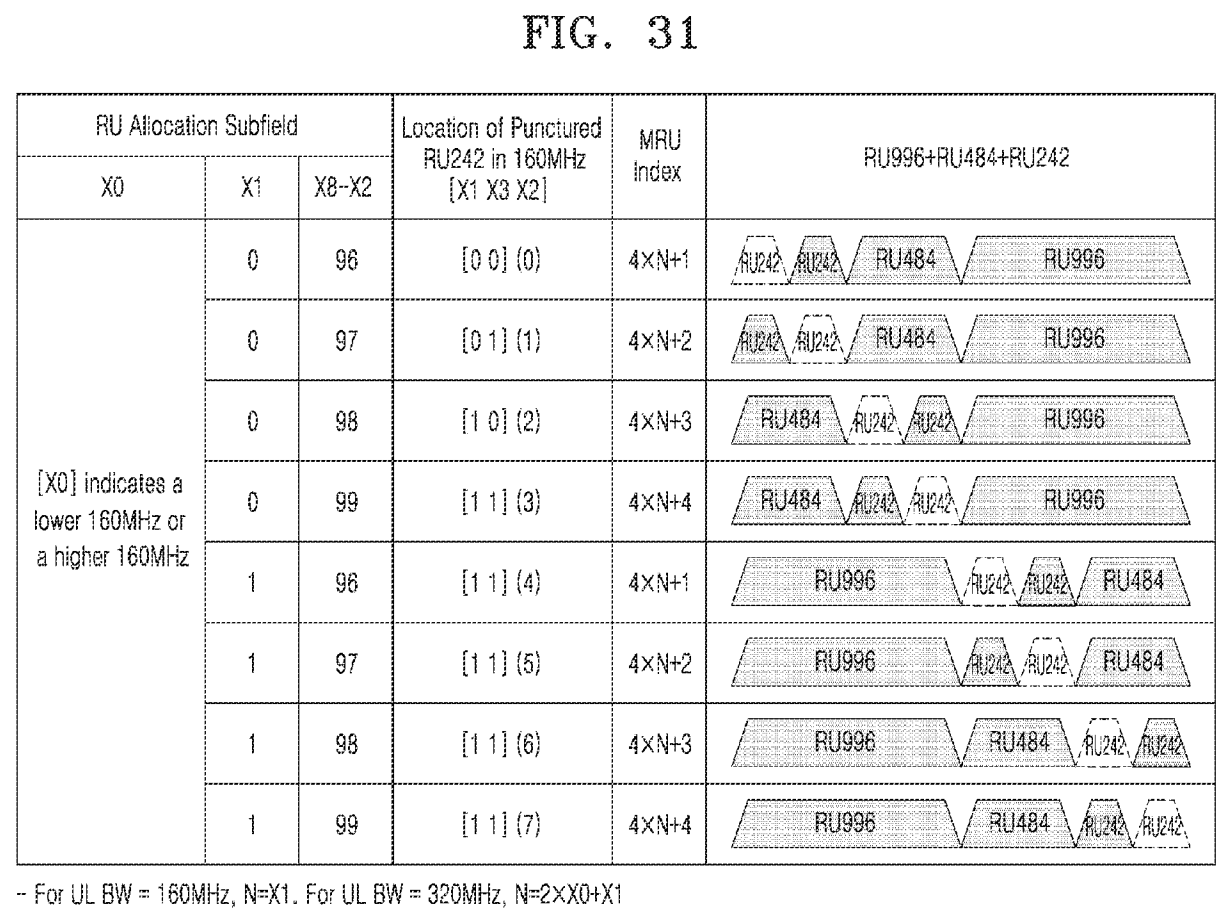

| RU Allocation Subfield | | | Location of Punctured RU242 in 160MHz [X1 X3 X2] | MRU index | RU996+RU484+RU242 |
|---|---|---|---|---|---|
| X0 | X1 | X8-X2 | | | |
| | 0 | 96 | [0 0] (0) | 4xN+1 | RU242, RU242 / RU484 / RU996 |
| | 0 | 97 | [0 1] (1) | 4xN+2 | RU242, RU242 / RU484 / RU996 |
| | 0 | 98 | [1 0] (2) | 4xN+3 | RU484 / RU242, RU242 / RU996 |
| | 0 | 99 | [1 1] (3) | 4xN+4 | RU484 / RU242, RU242 / RU996 |
| [X0] indicates a lower 160MHz or a higher 160MHz | 1 | 96 | [1 1] (4) | 4xN+1 | RU996 / RU242, RU242 / RU484 |
| | 1 | 97 | [1 1] (5) | 4xN+2 | RU996 / RU242, RU242 / RU484 |
| | 1 | 98 | [1 1] (6) | 4xN+3 | RU996 / RU484 / RU242, RU242 |
| | 1 | 99 | [1 1] (7) | 4xN+4 | RU996 / RU484 / RU242, RU242 |

- For UL BW = 160MHz, N=X1. For UL BW = 320MHz, N=2×X0+X1

FIG. 32

| RU Allocation Subfield | | | Location of Punctured RU484 in 240MHz [X1 X3 X2] | MRU index | 2xRU996+RU484 |
| X0 | X1 | X8-X2 | | | |
|---|---|---|---|---|---|
| 0 | 0 | 100 | [0 0 0] (0) | 1 | RU484, RU484 / RU996 / RU996 |
| 0 | 0 | 101 | [0 0 1] (1) | 2 | RU484, RU484 / RU996 / RU996 |
| 0 | 0 | 102 | [0 1 0] (2) | 3 | RU996 / RU484, RU484 / RU996 |
| 0 | 0 | 103 | [0 1 1] (3) | 4 | RU996 / RU484, RU484 / RU996 |
| 0 | 1 | 100 | [1 0 0] (4) | 5 | RU996 / RU484, RU484 / RU996 |
| 0 | 1 | 101 | [1 0 1] (5) | 6 | RU996 / RU484, RU484 / RU996 |
| 1 | 0 | 100 | [0 0 0] (0) | 7 | RU996 / RU484, RU484 / RU996 |
| 1 | 0 | 101 | [0 0 1] (1) | 8 | RU996 / RU484, RU484 / RU996 |
| 1 | 0 | 102 | [0 1 0] (2) | 9 | RU996 / RU484, RU484 / RU996 |
| 1 | 0 | 103 | [0 1 1] (3) | 10 | RU996 / RU484, RU484 / RU996 |
| 1 | 1 | 100 | [1 0 0] (4) | 11 | RU996 / RU996 / RU484, RU484 |
| 1 | 1 | 101 | [1 0 1] (5) | 12 | RU996 / RU996 / RU484, RU484 |

FIG. 33

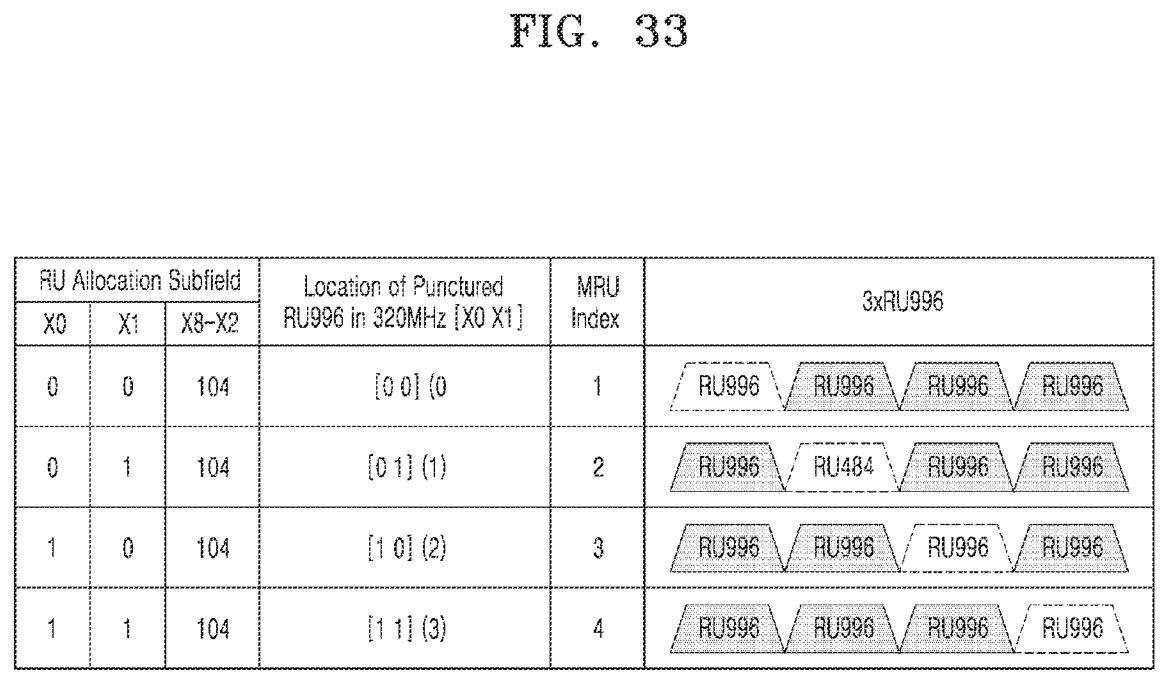

| RU Allocation Subfield | | Location of Punctured RU996 in 320MHz [X0 X1] | MRU Index | 3xRU996 |
| X0 | X1 | X8~X2 | | | |
|---|---|---|---|---|
| 0 | 0 | 104 | [0 0] (0) | 1 | RU996 / RU996 / RU996 / RU996 |
| 0 | 1 | 104 | [0 1] (1) | 2 | RU996 / RU484 / RU996 / RU996 |
| 1 | 0 | 104 | [1 0] (2) | 3 | RU996 / RU996 / RU996 / RU996 |
| 1 | 1 | 104 | [1 1] (3) | 4 | RU996 / RU996 / RU996 / RU996 |

FIG. 34

| RU Allocation Subfield | | | Location of Punctured RU484 in 320MHz [X0 X1 X2] | MRU index | 3xRU996+RU484 |
|---|---|---|---|---|---|
| X0 | X1 | X8-X2 | | | |
| 0 | 0 | 105 | [0 0 0] (0) | 1 | |
| 0 | 0 | 106 | [0 0 1] (1) | 2 | |
| 0 | 1 | 105 | [0 1 0] (2) | 3 | |
| 0 | 1 | 106 | [0 1 1] (3) | 4 | |
| 1 | 0 | 105 | [1 0 0] (4) | 5 | |
| 1 | 0 | 106 | [1 0 1] (5) | 6 | |
| 1 | 1 | 105 | [1 1 0] (6) | 7 | |
| 1 | 1 | 106 | [1 1 1] (7) | 8 | |

FIG. 35

| RU Allocation Subfield | X8 | X7 | X6 | X5 | X4 | X3 | X2 | X1 | X0 |

| UL Bandwidth | Lower 160MHz | Upper 160MHz |
|---|---|---|
| 320 MHz | [0] | [1] |

METHODS OF COMMUNICATION OF MULTI-RU ALLOCATION

CROSS-REFERENCE TO RELATED APPLICATIONS

This application is a continuation under 35 U.S.C. 120 of U.S. patent application Ser. No. 17/313,232, filed May 6, 2021, which is related to and claims priority under 35 U. S. C. § 119 to U.S. Provisional Application No. 63/025,279 filed on May 15, 2020; U.S. Provisional Application No. 63/073,628 filed on Sep. 2, 2020; U.S. Provisional Application No. 63/089,275 filed on Oct. 8, 2020; U.S. Provisional Application No. 63/094,686 filed on Oct. 21, 2020; U.S. Provisional Application No. 63/106,128 filed on Oct. 27, 2020; U.S. Provisional Application No. 63/109,024 filed on Nov. 3, 2020; U.S. Provisional Application No. 63/118, 788 filed on Nov. 27, 2020; and Korean Patent Application No. 10-2021-0009755 filed on Jan. 22, 2021 in the Korean Intellectual Property Office, the disclosures of which are incorporated by reference herein in their entireties.

TECHNICAL FIELD

This disclosure relates generally to wireless communications and more particularly to an apparatus and method of communication based on an extended bandwidth and a multi-resource unit (multi-RU) in a wireless local area network (WLAN) system.

DISCUSSION OF RELATED ART

WLAN is a technology for wirelessly connecting two or more devices to each other, where the devices are located in a local environment such as a building or campus. A WLAN may in an infrastructure mode in which an access point (AP) serves multiple user devices such as smartphones and laptops, where the AP may serve as a gateway to a remote network, typically the Internet. A WLAN alternatively operates as an ad hoc network between peer devices without an AP. In either case, WLAN employs orthogonal frequency division multiplexing (OFDM) technology in which each user device communicates with an AP or another user device using an assigned set of OFDM subcarriers within an overall frequency band of the WLAN.

Currently, most WLAN technology is based on the institute of electrical and electronics engineers (IEEE) 802.11 standard. The IEEE 802.11 standard has been developed into 802.11b, 802.11a, 802.11g, 802.11n, 802.11ac, and 802.11ax versions and may support a transmission speed up to 1 Gbyte/s through use of OFDM technology. In version 802.11ac, data may be simultaneously transmitted to multiple users through a multi-user multi-input multi-output (MU-MIMO) scheme. In 802.11ax (referred to as just "high efficiency" (HE)), by providing available subcarriers to users in a divided manner with orthogonal frequency division multiple access (OFDMA) technology, in conjunction with applying MU-MIMO, multiple access is implemented. The WLAN system to which 802.11ax is applied may effectively support communication in a crowded area and outdoors.

Another recent version, 802.11be (extremely high throughput (EHT)), is slated to support a 6 GHz unlicensed frequency band, a bandwidth up to 320 MHz per channel, hybrid automatic repeat and request (HARQ), and up to 16×16 MIMO. Therefore, a next generation WLAN system is expected to effectively support low latency and ultra-fast transmission with performance metrics similar to new radio (NR) 5G technology.

SUMMARY

Embodiments of the inventive concept provide an apparatus and method of efficiently allocating a multi-RU to a user within an extended uplink bandwidth in a wireless local area network (WLAN) system.

According to an aspect, a method of communicating, by a first device, with at least one second device in a WLAN system may include allocating at least one resource unit (RU) within a bandwidth to a second device. At least one subfield is generated defining the at least one RU. This may involve setting at least two bits as a value defining a subband that includes the at least one RU when the bandwidth comprises at least four subbands. A trigger frame is generated including a user information field that includes the at least one subfield. A physical layer protocol data unit PPDU) including the trigger frame is transmitted to the at least one second device.

According to another aspect, a first device configured to communicate with at least one second device in a WLAN system may include a transceiver configured to transmit a PPDU to the at least one second device. The transceiver includes a signal processor configured to allocate at least one RU to the second device within a bandwidth, generate at least one subfield defining the at least one RU, generate a trigger frame including a user information field including the at least one subfield, and generate the PPDU including the trigger frame. The signal processor is configured to set at least 7 bits associated with the at least one RU and to set at least two bits as a value defining a subband including the at least one RU when the bandwidth comprises at least four subbands.

According to another aspect, a method of communicating, by a second device, with a first device in a WLAN system may include receiving a PPDU from the first device; extracting common information from the PPDU and extracting an uplink bandwidth field from the common information; extracting user information from the PPDU, and extracting at least one subfield from the user information; and identifying at least one RU within a bandwidth, based on the uplink bandwidth field and the at least one subfield. The identifying of the at least one RU includes identifying, based on at least first and second bits of the at least one subfield, a subband including the at least one RU when the bandwidth includes at least four subbands.

According to another aspect, a method of communicating, by a first device, with at least one second device in a WLAN system may include allocating at least one RU within a bandwidth of 320 MHz to a second device; and generating at least one subfield defining the at least one RU, where the generating includes setting at least eight bits associated with the at least one RU and setting a first bit with a value representing one of the lower 160 MHz and the upper 160 MHz that includes the at least one RU when the bandwidth is 320 MHz and a total bandwidth of the at least one RU is 160 MHz or less. A trigger frame is generated and a PPDU is transmitted as outlined above.

In another aspect, a method of communicating, by a first device, with at least one second device in a WLAN system includes: allocating at least one RU within a bandwidth including a plurality N of subbands to a second device; generating at least one subfield defining the at least one RU, where the generating comprises setting a plurality K of bits associated with the at least one RU, and setting M additional bits with values that collectively define one of the subbands including the at least one RU, where M<N<K. A trigger frame is generated and a PPDU is transmitted as outlined above.

BRIEF DESCRIPTION OF THE DRAWINGS

Embodiments of the inventive concept will be more clearly understood from the following detailed description taken in conjunction with the accompanying drawings in which like reference characters refer to like elements throughout, wherein:

FIGS. 9A and 9B are diagrams illustrating examples of RUs available in a 20 MHz OFDMA PPDU and indexes thereof;

FIGS. 10A and 10B are diagrams illustrating examples of RUs available in a 40 MHz OFDMA PPDU and indexes thereof;

FIGS. 11A and 11B are diagrams illustrating examples of RUs available in an OFDMA PPDU and indexes thereof;

FIGS. 12A and 12B are diagrams illustrating examples of indexes of RUs available in a 160 MHz OFDMA PPDU;

FIGS. 13A, 13B, 13C, 13D, and 13E are diagrams illustrating examples of indexes of RUs available in a 320 MHz OFDMA PPDU;

FIG. 18 shows small-size multi-RUs allocable to a STA in an OFDMA 20 MHz EHT PPDU according to an embodiment;

FIG. 19 shows small-size multi-RUs allocable to a STA in an OFDMA 40 MHz EHT PPDU according to an embodiment;

FIG. 20 shows small-size multi-RUs allocable to a STA in an OFDMA 80 MHz EHT PPDU according to an embodiment;

FIGS. 21A and 21B show small-size multi-RUs allocable to a STA in an OFDMA 160 MHz EHT PPDU according to an embodiment;

FIGS. 22A, 22B, and 22C show small-size multi-RUs allocable to a STA in an OFDMA 320 MHz EHT PPDU according to an embodiment;

FIG. 23 shows large-size multi-RUs allocable to a STA in an OFDMA 80 MHz EHT PPDU according to an embodiment;

FIG. 24 shows large-size multi-RUs allocable to a STA in an OFDMA 160 MHz EHT PPDU according to an embodiment;

FIGS. 25A, 25B, and 25C show large-size multi-RUs allocable to a STA in an OFDMA 320 MHz EHT PPDU according to an embodiment;

FIG. 27 is a flowchart illustrating a method of communication based on an extended bandwidth and a multi-RU according to an embodiment;

FIGS. 28A and 28B are diagrams illustrating examples of a user information field according to example embodiments;

FIGS. 29A and 29B are diagrams illustrating an RU allocation subfield according to an embodiment;

FIG. 30 shows values of multi-RUs including a 996-tone RU and a 484-tone RU and an RU allocation subfield according to an embodiment;

FIG. 31 shows values of multi-RUs including a 996-tone RU, a 484-tone RU, and a 242-tone RU and an RU allocation subfield according to an embodiment;

FIG. 32 shows values of multi-RUs including two 996-tone RUs and 484-tone RUs and an RU allocation subfield according to an embodiment;

FIG. 33 shows values of multi-RUs including three 996-tone RUs and an RU allocation subfield according to an embodiment;

FIG. 34 shows values of multi-RUs including three 996-tone RUs and 484-tone RUs and an RU allocation subfield according to an embodiment; and FIG. 35 is a diagram illustrating an RU allocation subfield according to an embodiment.

DETAILED DESCRIPTION OF EMBODIMENTS

Figure 1:
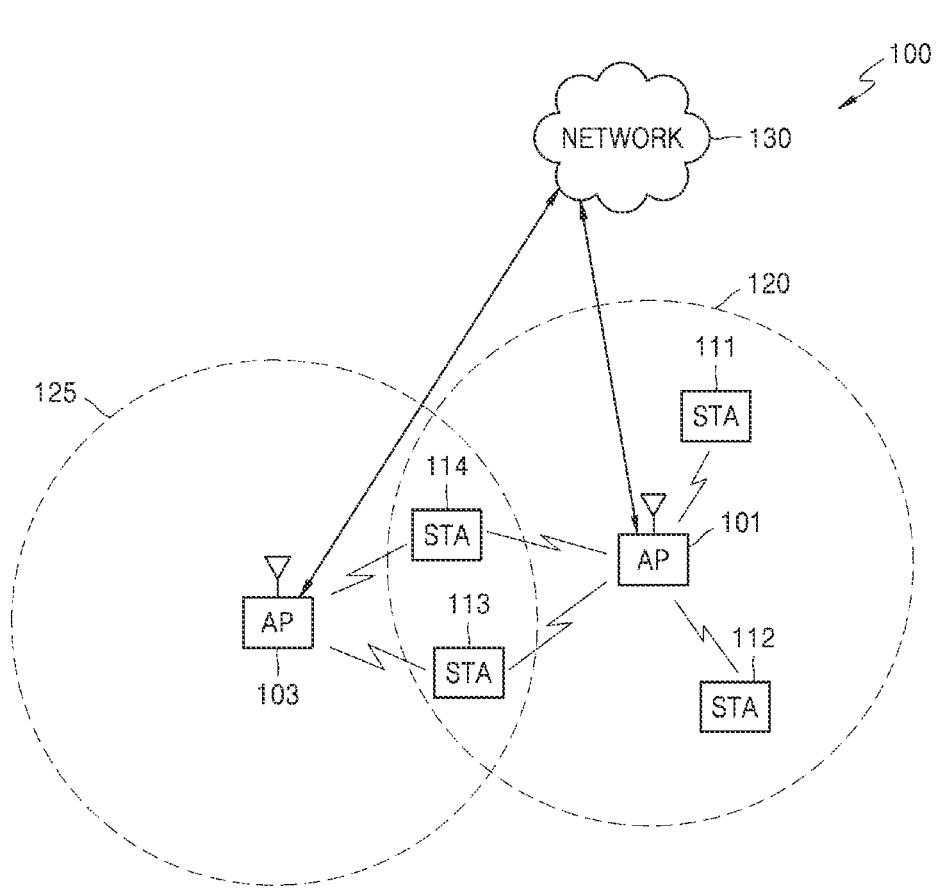
FIG. 1 is a view illustrating a wireless local area network (WLAN) system.

Hereinafter, embodiments of the inventive concept will be described in detail with reference to the accompanying drawings.

Terms used herein are for describing embodiments and are not for limiting the inventive concept. Herein, a singular form includes a plural form unless specially described. Described components, processes, operations and/or elements do not exclude the presence or addition of one or more other components, processes, operations and/or elements.

Unless otherwise defined, all the terms (including technological and scientific terms) used herein may be used in the meaning that may be commonly understood by those skilled in the art. In addition, terms defined in a commonly used dictionary are not ideologically or excessively interpreted unless specially defined.

In addition, in specifically describing the embodiments of the inventive concept, OFDM or an OFDM-based wireless communication system, in particular, the IEEE 802.11 standard is to be mainly described. However, the inventive concept may also be applied to other communication systems with a similar technological background and channel type (for example, a cellular communication system such as long term evolution (LTE), LTE-Advanced (LTE-A), new radio (NR)/5G, wireless broadband (WIBRO), or global system for mobile communication (GSM) or a remote communication system such as BLUETOOTH or near field communication (NFC).

Herein, the term "connects (combines)" and derivatives thereof refer to direct or indirect communication between two or more components that physically contact or do not physically contact. The terms "transmits", "receives", and "communicates" and derivatives thereof include all direct and indirect communication. "Comprises" and/or "comprising" used herein mean inclusion without limit. "Or" is a collective term meaning 'and/or'. "Is related to ~" and derivatives thereof mean includes, is included in ~, is connected to ~, implies, is implied in ~, is connected to ~, is combined with ~, may communicate with ~, cooperates with ~, interposes, puts in parallel, is close to ~, is bound to ~, has, has a feature of ~, and has a relation with ~. "A controller" means a certain device, system, or a part thereof controlling at least one operation. The controller may be implemented by hardware or a combination of hardware and software and/or firmware. A function related to a specific controller may be locally or remotely concentrated or dispersed.

In addition, various functions described hereinafter may be implemented or supported by one or more computer programs and each of the programs is formed of computer-readable program code and is executed in a computer-readable recording medium. "An application" and "a program" refer to one or more computer programs, software components, instruction sets, processes, functions, objects, classes, instances, related data, or parts thereof suitable for implementation of pieces of computer-readable program code. "Computer-readable program code" include all types of computer code including source code, object code, and execution code. "Computer-readable media" include all types of media that may be accessed by a computer such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-transitory computer-readable media include a medium in which data may be permanently stored and a medium in which data may be stored and may be overwritten later such as a rewritable optical disk or a deletable memory device.

Herein, the terms "subcarrier" and "tone" may be used interchangeably, and a "size of an RU" means a number of tones of an RU.

Herein, a "leftmost side of a band" refers to a range of frequencies within the band starting at the lowest frequency within the band.

Figure 2:
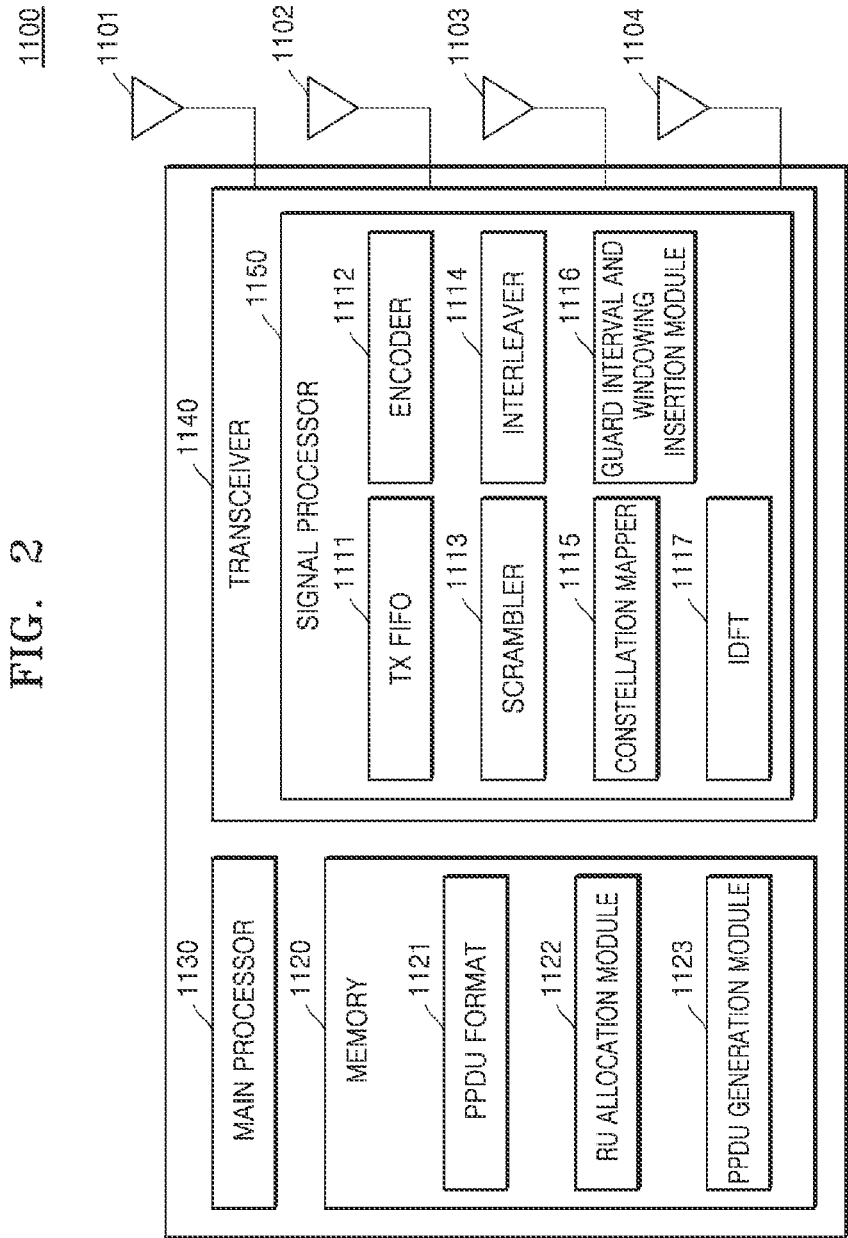
FIG. 2 is a block diagram illustrating a wireless communication device transmitting or receiving a physical layer convergence protocol (PLCP) protocol data unit (PPDU)

FIG. 1 is a view illustrating a wireless local area network (WLAN) system 100. FIG. 2 is a block diagram illustrating a wireless communication device 1100 transmitting or receiving a physical layer convergence protocol (PLCP) protocol data unit (PPDU). As illustrated in FIG. 1, the WLAN system 100 may include access points (AP) 101 and 103. The APs 101 and 103 may communicate with at least one network 130 such as the Internet, an internet protocol (IP) network, or a private data network.

The APs 101 and 103 may provide wireless connection to the network 130 for a plurality of stations (STAs) 111 to 114 in coverage areas 120 and 125 thereof. The APs 101 and 103 may communicate with each other and with the STAs 111 to 114 by using WIFI or other WLAN communication technologies. Herein, AP may be referred to as a first device or a transmitting device, and STA may be referred to as a second device or a receiving device.

For example, in accordance with a network type, other well-known terms such as "a router" and "a gateway" may be used instead of "the AP". In addition, in the WLAN, the AP is provided for a wireless channel. An AP may operate as a STA in some scenarios, such as when a first AP communicates with a second AP, and the second AP operates as a STA based on control information provided by the first AP.

In addition, in accordance with the network type, "STA" may be used instead of other well-known terms such as "a mobile station", "a subscriber station", "a remote terminal", "user equipment", "a wireless terminal", "a user device", or "a user". For convenience, herein, "STA" is used for representing a remote wireless device wirelessly connected to the AP or connected to the wireless channel in the WLAN. Herein, a STA is considered as a mobile device (e.g., a mobile telephone or a smartphone). In other examples, a STA is a fixed device (e.g., a desktop computer, the AP, a media player, a fixed sensor, or a television set).

Approximate extents of the coverage areas 120 and 125 are marked with dashed lines. Here, the coverage areas 120 and 125 are illustrated as being circular for simplicity of explanation. However, each of the coverage areas 120 and 125 related to the APs 101 and 103 may have another shape to which a varying change in wireless environment related to a natural or artificial obstruction is reflected or another irregular shape in accordance with setting of the APs 101 and 103.

As described in detail later, the APs 101 and 103 may include circuitry and/or a program for managing transmission of an uplink multiuser (ULMU) or a downlink multiuser (DLMU) in the WLAN system 100.

In other examples, the WLAN system 100 may include an arbitrary number of properly arranged APs and an arbitrary number of STAs. In addition, the AP 101 may directly communicate with an arbitrary number of STAs. The AP 101 may provide wireless broadband access to the plurality of STAs 111 to 114 via the network 130.

Similarly, each of the APs 101 and 103 may directly communicate with the network 130 and may provide wireless broadband access to the plurality of STAs 111 to 114 via the network 130. In addition, the APs 101 and 103 may be configured to connect to a varying external network such as an external telephone network or a data network.

As depicted in FIG. 2, a wireless communication device transmitting or receiving the PPDU is illustrated. For example, the wireless communication device 1100 of FIG. 2 may be a transmission device (e.g., an AP) or a receiving device (e.g., a STA) with a transceiver capable of performing data communication. That is, the wireless communication device 1100 of FIG. 2 may be one of the APs 101 and 103 and the plurality of STAs 111 to 114 illustrated in FIG. 1 and may be applied to a sensor used for, for example, a computer, a smartphone, a portable electronic device, a tablet, a wearable device, or an Internet of Things (IoT). In the following description, a STA is an example of a "receiving device". Moreover, the terms "user" and "STA" may be used interchangeably. Further, an AP is an example of a "transmitting device" in the following description.

For ease of explanation, hereinafter, a case in which the wireless communication device 1100 is the transmission device is taken as an example.

The wireless communication device 1100 may include a main processor 1130, memory 1120, a transceiver 1140, and antenna arrays 1101 to 1104. The main processor 1130, the memory 1120, the transceiver 1140, and the antenna arrays 1101 to 1104 may be directly or indirectly connected to each other.

The main processor 1130 may control the memory 1120 and the transceiver 1140. A PPDU format and multiple resource unit (RU) allocation information may be stored in the memory 1120. The transceiver 1140 may generate the PPDU by using the PPDU format and the multiple RU allocation information stored in the memory 1120. The transceiver 1140 may transmit the generated PPDU to an external receiving device through the antenna arrays 1101 to 1104.

Here, the memory 1120 may store a PPDU format 1121 including a RU allocation signaling format according to an embodiment of the inventive concept, which will be described later. The memory 1120 may store processor-executable instructions executing a RU allocation module 1122 and a PPDU generation module 1123. The processor-executable instructions may be executed by the main processor 1130, in which case circuitry of the main processor 1130 performs the functions of the RU allocation module 1122 and the PPDU generation module 1123; accordingly, these modules may interchangeably be called RU allocation circuitry 1122 and PPDU generation circuitry, respectively.

For example, the RU allocation module 1122 may use an RU allocation algorithm, method, or policy to allocate at least one RU (e.g., a single RU or a multiple RU) to a user according to an embodiment of the inventive concept. The PPDU generation module 1123 may generate signaling and indication related to allocation of the at least one RU in a trigger frame of the PPDU.

On the other hand, the transceiver 1140 may include a signal processor 1150. The signal processor 1150 may include various transmission path modules generating sections of the PPDU or various types of communication transmission units.

The signal processor 1150 may include a transmit first-in-first-out (TX FIFO) 1111, an encoder 1112, a scrambler 1113, an interleaver 1114, a constellation mapper 1115 capable of, for example, generating a QAM symbol, a guard interval and windowing insertion module 1116 capable of, for example, providing a guard interval on a frequency to reduce interference on a spectrum and transforming a signal through windowing, and an inversed discrete Fourier transformer (IDFT) 1117.

It is noted that the transceiver 1140 may include parts well-known to those skilled in the art as illustrated in the drawing. The corresponding parts may be executed by a method well-known to those skilled in the art by using hardware, firmware, software logic, or a combination of hardware, firmware, and software logic.

When the wireless communication device 1100 is a receiving device, the transceiver 1140 illustrated in FIG. 2 may include components in a receiving path.

That is, when the wireless communication device 1100 is a receiving device, the transceiver 1140 may receive the PPDU including a trigger frame from the transmission device. The transceiver 1140 may decode the trigger frame included in the received PPDU. That is, the transceiver 1140 may identify an RU allocated for the receiving device by decoding the trigger frame through an internal decoder (not shown), decode the trigger frame, identify at least one RU allocated to uplink bandwidth and the receiving device and transmit PPDU to the transmitting device based on the identified at least one RU. Alternatively, the decoding may be performed by a component other than the transceiver 1140, e.g., the main processor 1130.

Hereinafter, high efficiency (HE) PPDUs used in the institute of electrical and electronics engineers (IEEE) standard (that is, 802.11ax) will be described with reference to FIGS. 3 to 6. For example, the HE PPDUs described with reference to FIGS. 3 to 15 may be generated by the wireless communication device 1100 of FIG. 2.

Figure 3:
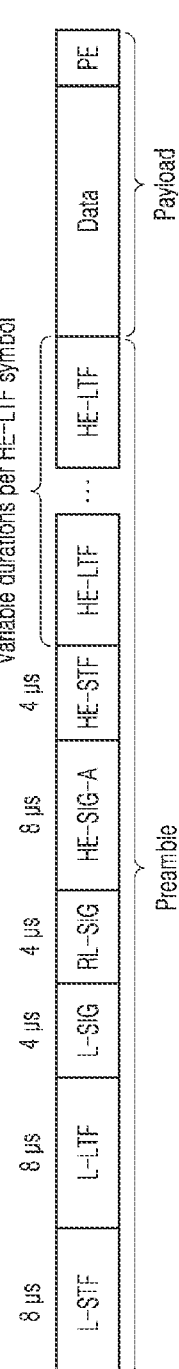
FIG. 3 is a view illustrating a structure of a high efficiency (HE) single user (SU) PPDU.
Figure 4:
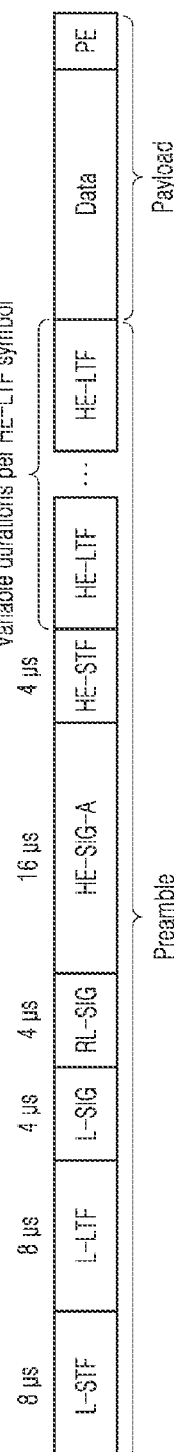
FIG. 4 is a view illustrating a structure of an HE extended range (ER) SU PPDU.
Figure 5:
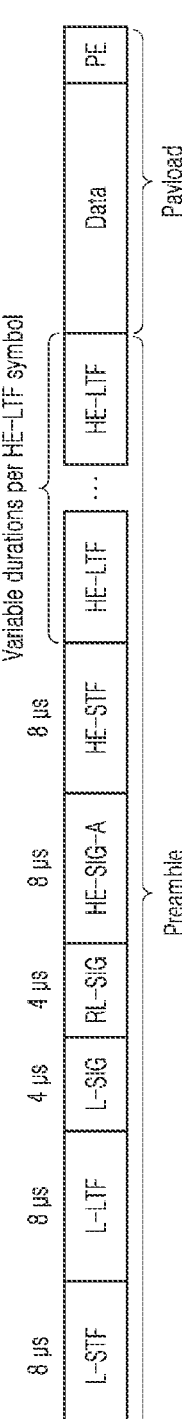
FIG. 5 is a view illustrating a structure of an HE trigger based (TB) PPDU.
Figure 6:
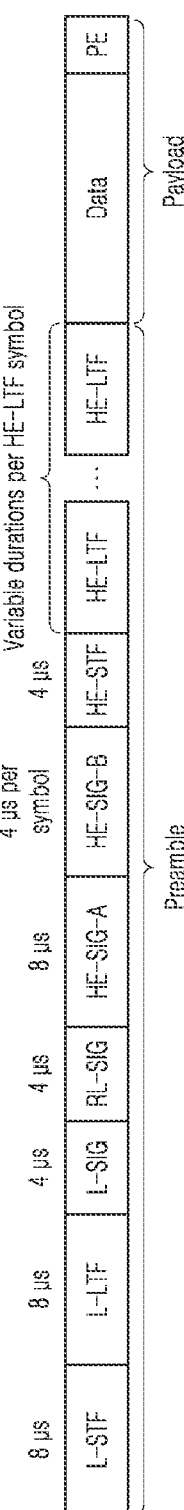
FIG. 6 is a view illustrating a structure of an HE multiuser (MU) PPDU.

FIG. 3 is a view illustrating a structure of an HE single user (SU) PPDU. FIG. 4 is a view illustrating a structure of an HE extended range (ER) SU PPDU. FIG. 5 is a view illustrating a structure of an HE trigger based (TB) PPDU. FIG. 6 is a view illustrating a structure of an HE multiuser (MU) PPDU. As illustrated in FIGS. 3 to 6, each HE PPDU may include a preamble including a plurality of training fields and a plurality of signaling fields and a payload including a data (DATA) field and a packet extension (PE) field.

Each HE PPDU may include a legacy-short training field (L-STF) with a length of 8 us, a legacy-long training field (L-LTF) with a length of 8 us, a legacy-signal (L-SIG) field with a length of 4 us, a repeated L-SIG (RL-SIG) field with a length of 4 us, a high efficiency-signal-A (HE-SIG-A) field with a length of 8 us, an HE-STF with a length of 4 us, an HE-LTF, a DATA field, and a PE field.

The HE SU PPDU of FIG. 3 does not include an HE-SIG-B field, and the HE MU PPDU of FIG. 6 may further include the HE-SIG-B field. The HE ER SU PPDU of FIG. 4 does not include the HE-SIG-B field. However, a symbol of the HE-SIG-A field may be repeated with a length of 16 us. In addition, the HE TB PPDU of FIG. 5 does not include the HE-SIG-B field. However, a symbol of the HE-STF may be repeated with a length of 8 us.

Here, the fields included in the preamble will be simply described as follows.

The L-STF may include a short training orthogonal frequency division multiplexing (OFDM) symbol and may be used for frame detection, automatic gain control (AGC), diversity detection, and coarse frequency/time synchronization.

The L-LTF may include a long training OFDM symbol and may be used for fine frequency/time synchronization and channel estimation.

The L-SIG field may be used for transmitting control information and may include information on a data rate and a data length. For example, the L-SIG field may be repeatedly transmitted. A format in which the L-SIG field is repeated is referred to as the RL-SIG field.

The HE-SIG-A field may include control information common to the receiving device, which is as follows.

1) a downlink (DL)/uplink (UL) indicator
2) a basic service set (BSS) color field that is an identifier of a BSS
3) a field indicating a remaining time of a current transmission opportunity (TXOP) period
4) a bandwidth field indicating 20/40/80/160/80+80 MHz
5) a field indicating a modulation and coding scheme (MCS) applied to the HE-SIG-B field
6) a field indicating whether the HE-SIG-B field is modulated by a dual subcarrier modulation scheme
7) a field indicating the number of symbols used for the HE-SIG-B field
8) a field indicating whether the HE-SIG-B field is generated over the entire band
9) a field v the number of symbols of the HE-LTF
10) a field indicating a length of the HE-LTF and a length of a cyclic prefix (CP) field
11) a field indicating whether an additional OFDM symbol is provided for low density parity check (LDPC) coding
12) a field indicating control information on the PE field 13) a field indicating information on a cyclical redundancy check (CRC) field of the HE-SIG-A field The HE-SIG-A field may further include various information items other than the above-described 1) to 13) or may not include partial information items among the above-described 1) to 13). In environments other than an MU environment, partial information items may be further added to the HE-SIG-A field or partial information items of the HE-SIG-A field may be omitted.

The HE-SIG-B field may be used for the PPDU for the MU. Thus, the HE-SIG-B field may be omitted from the PPDU for the SU. For example, because the HE-SIG-A field or the HE-SIG-B field may include RU allocation information on at least one receiving device for downlink transmission. The PE field may have duration of 4 □s, 8 □s, 12 □s, or 16 □s and may provide an additional receive processing time at an end of the HE PPDU.

Figure 7:
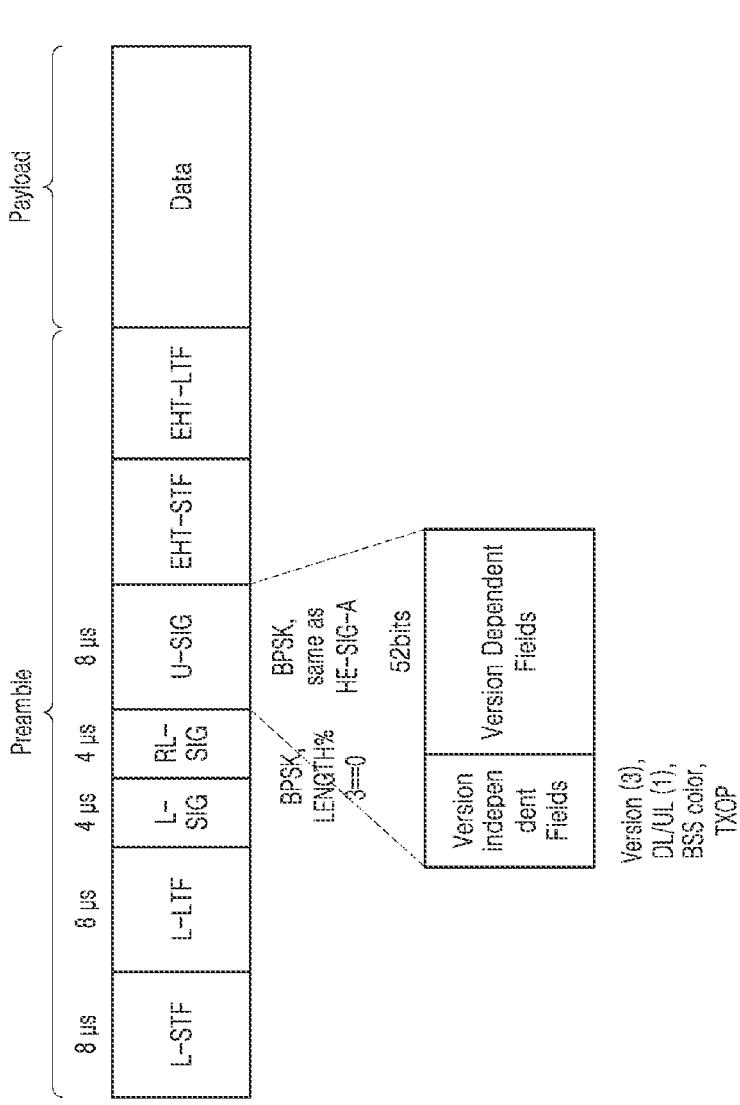
FIG. 7 is a view illustrating a structure of the HE-SIG-B field of FIG. 6.
Figure 8:
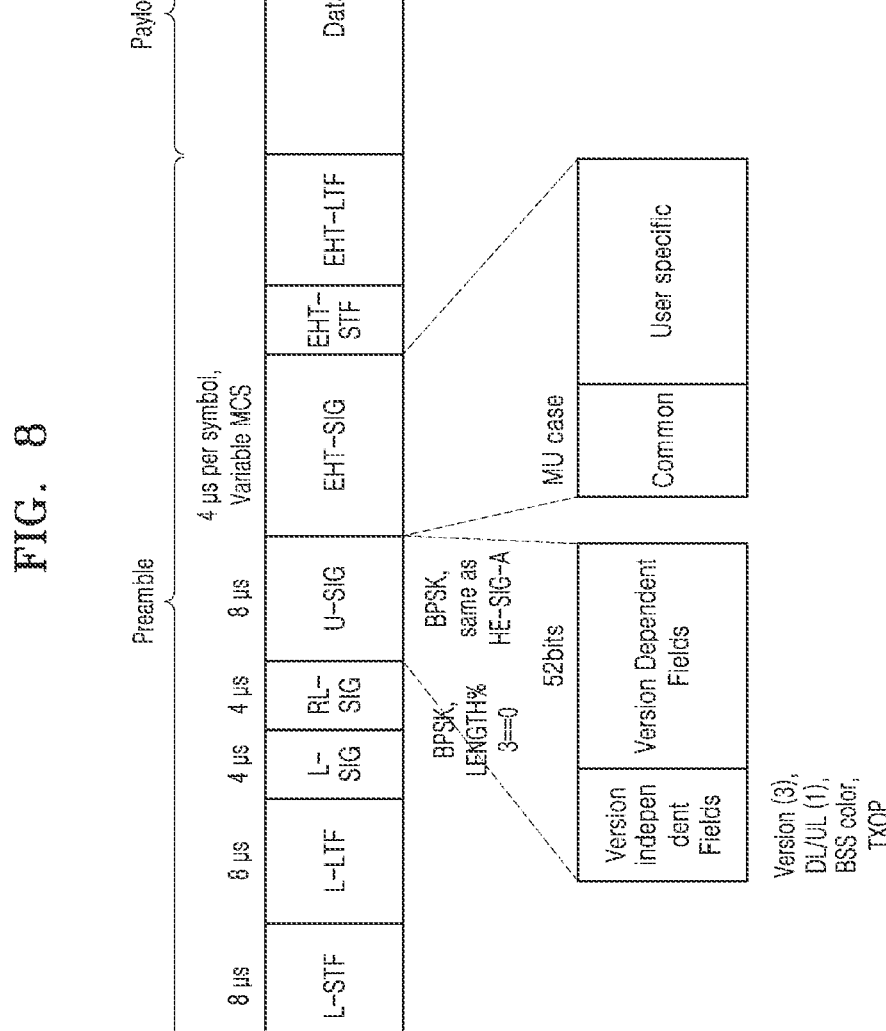
FIG. 8 is a view illustrating that the HE MU PPDU is arranged by frequency band.

FIG. 7 is a view illustrating a structure of an EHT TB PPDU. FIG. 8 is a view illustrating a structure of an EHT MU PPDU. An embodiment of the inventive concept may also be applied to 802.11be, which is a next generation WLAN standard. Therefore, because the method and the apparatus for allocating the RU according to an embodiment of the inventive concept may be implemented in signaling fields (for example, extremely high throughout (EHT)-SIG fields) of EHT PPDUs, hereinafter, with reference to FIGS. 18 and 19, the EHT PPDUs used in the IEEE standard (that is, 802.11be) will be described. For reference, the EHT PPDUs described with reference to FIGS. 7 and 8 may be generated by the wireless communication device 1100 of FIG. 2.

As illustrated in FIGS. 7 and 8, each EHT PPDU may include a preamble including a plurality of training fields and a plurality of signaling fields and a payload including a data field.

Each EHT PPDU may include an L-STF with a length of 8 us, an L-LTF with a length of 8 us, an L-SIG field with a length of 4 us, a repeated L-SIG (RL-SIG) field with a length of 4 us, a universal-signal (U-SIG) field with a length of 8 us, an EHT-STF, an EHT-LTF, and a DATA field.

The EHT TB PPDU of FIG. 7 does not include an EHT-SIG field. However, a symbol of the EHT-STF may be repeated. The EHT MU PPDU of FIG. 8 may consist of a plurality of OFDM symbols and may further include the EHT-SIG field. In addition, like the above-described HE TB PPDU of FIG. 5, the EHT TB PPDU of FIG. 7 may require a trigger frame to transmit the EHT TB PPDU. The trigger frame for transmitting the EHT TB PPDU may have a structure and a function similar to those of a trigger frame of FIG. 14 described later.

For example, a PE field may be further included in each EHT PPDU. The figures herein, however, illustrate EHT PPDUs without PE field.

Fields included in each EHT PPDU will be simply described as follows.

Because 'the L-STF', 'the L-LTF', 'the L-SIG field', and 'the RL-SIG field' of each EHT PPDU are the same as or similar to 'the L-STF', 'the L-LTF', 'the L-SIG field', and 'the RL-SIG field' of the above-described HE PPDU, detailed description thereof will be omitted.

The U-SIG field performing a function similar to that of the HE-SIG-A field of the HE PPDU may be arranged immediately next to the RL-SIG field and may include commonly encoded two OFDM symbols.

The U-SIG field may include 'version-independent fields' and 'version-dependent fields' and 'the version-dependent fields' may be arranged next to 'the version-independent fields'.

Here, 'the version-independent fields' may have static location and bit definition over different generations/physical versions.

In addition, 'the version-independent fields' may include, for example, next control information, as follows:
1) a PHY version identifier (consisting of three bits)
2) an uplink (UL)/downlink (DL) flag (consisting of one bit)
3) a BSS color field that is an identifier of a BSS
4) a TXOP duration (that is, a field indicating a remaining time of a current TXOP period)
5) a bandwidth field (that may carry partial "puncturing" information, where a "punctured" subset of frequencies within the bandwidth field are frequencies that are not used. Puncturing of frequencies may typically be implemented to avoid interference with another AP using the frequencies.).

On the other hand, 'the version-dependent fields' may have variable bit definition in each PHY version.

In addition, 'the version-dependent fields' may include, for example, next control information as follows:
1) a PPDU type (a field indicating the PPDU type)
2) an EHT-SIG modulation and coding scheme (MCS) (a field indicating the MCS and provided in the U-SIG field of the EHT PPDU, which is transmitted to the MU)
3) the number of EHT-SIG symbols (a field indicating the number of symbols used for the EHT-SIG field and provided in the U-SIG field of the EHT PPDU, which is transmitted to the MU).

The U-SIG field may further include various information items other than the above-described control information or may not include partial information among the above-described control information items. In environments other than an MU environment, partial information may be further added to the U-SIG field or partial information of the U-SIG field may be omitted.

The EHT-SIG field performing a function similar to that of the HE-SIG-B field of the HE PPDU may be arranged immediately next to the U-SIG field in the EHT PPDU, which is transmitted to the MU, and may have a variable MCS and a variable length.

The EHT-SIG field may include a common field including common control information and a user-specific field including user-specific control information.

Here, the common field may be encoded apart from the user-specific field. In addition, the common field may include RU allocation related information for downlink transmission (for example, information including 'an RU allocation subfield' and 'an additional RU allocation subfield', which is described later) and the user-specific field may include information (that is, user information allocated for each RU) similar to information included in the user-specific field of the above-described HE-SIG-B field.

For example, in the common field of the EHT-SIG field of the EHT PPDU, which is transmitted to the MU, at least one compression mode in which 'the RU allocation subfield' is not provided may be provided. In addition, the EHT-SIG field may be basically used for the PPDU for the MU. However, unlike in 'the HE PPDU', when an overhead of the U-SIG field increases, the EHT-SIG field may be used for the PPDU for transmitting the SU.

Figure 9A:
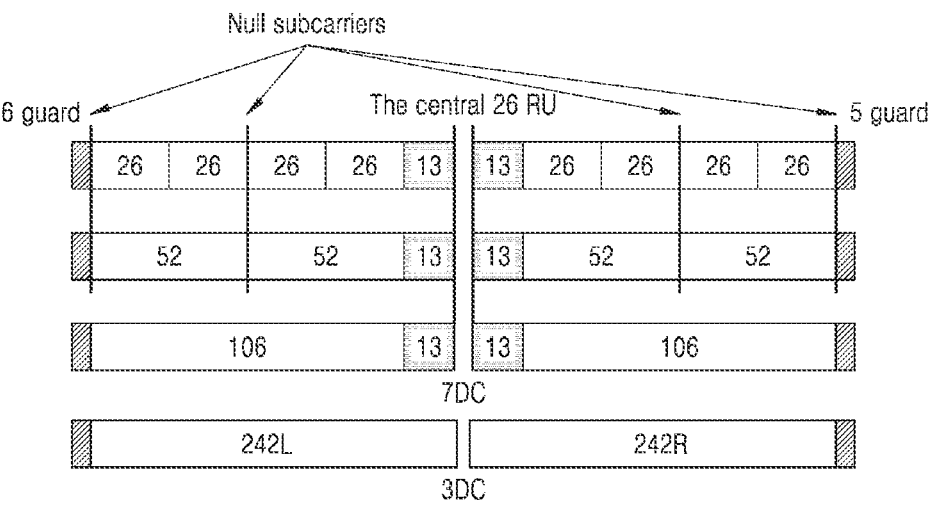
Figure 10A:
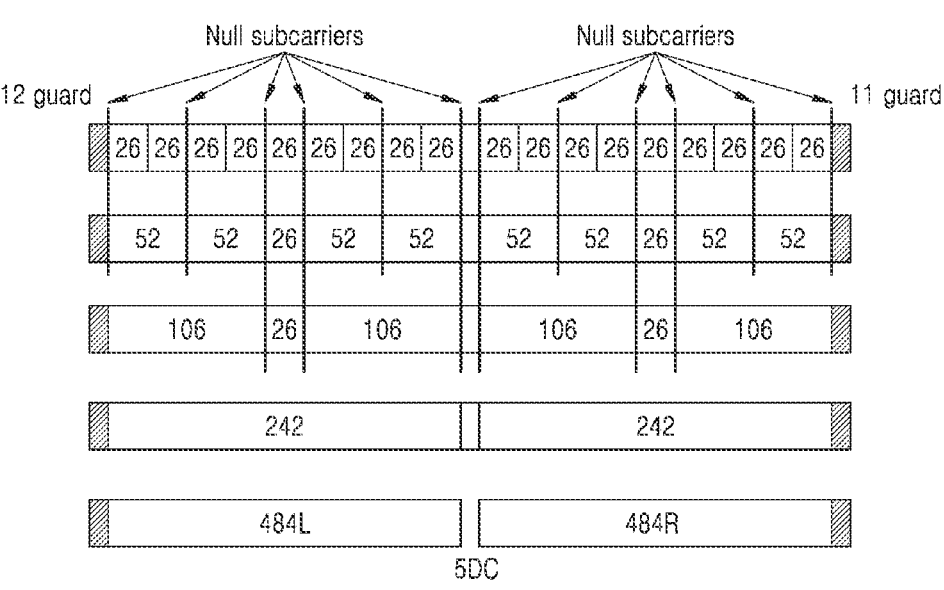
Figure 11A:
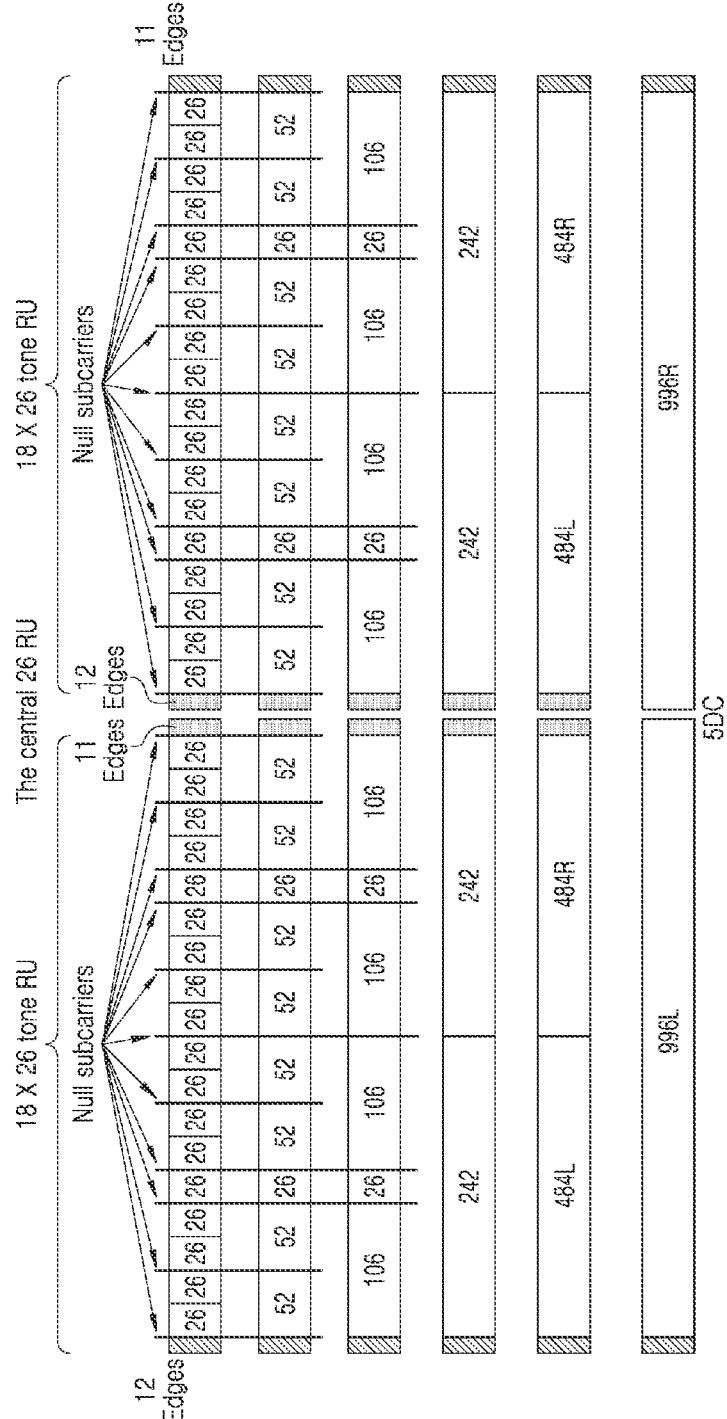

FIGS. 9A and 9B are diagrams illustrating examples of RU available in a 20 MHz OFDMA PPDU and indexes thereof; FIGS. 10A and 10B are diagrams illustrating examples of RU available in a 40 MHz OFDMA PPDU and indexes thereof; FIGS. 11A and 11B are diagrams illustrating examples of RU available in an 80 MHz OFDMA PPDU and indexes thereof; FIGS. 12A and 12B are diagrams illustrating examples of indexes of RU available in a 160 MHz OFDMA PPDU. FIGS. 13A, 13B, 13C, 13D, and 13E are diagrams illustrating examples of indexes of RU available in a 320 MHz OFDMA PPDU. That is, as illustrated in FIGS. 9A, 10A and 11A, at least one RU may be arranged in the frequency domain of the data field (the horizontal axis of each of FIGS. 9A, 10A and 11A represents the frequency domain). In FIGS. 9B, 10B, 11B, 12A, 12B, 13A, 13B, 13C, 13D and 13E, a zero index of subcarrier may correspond to a DC-tone, a negative index of subcarrier may correspond to a subcarrier having a frequency lower than the DC-tone, and a positive index of subcarrier may correspond to a subcarrier having a frequency higher than the DC-tone.

First, in FIG. 9A, the arrangement of the RU available in the 20 MHz OFDMA PPDU is illustrated. In the leftmost band of a 20 MHz band, six tones (that is, subcarriers) may be used as a guard band and, in the rightmost band of the 20 MHz band, five tones may be used as a guard band. In addition, 26-tone RUs, 52-tone RUs, and 106-tone RUs may be allocated for other bands. Seven direct current (DC) tones may be inserted into a central band, that is, a DC band and a 26-tone RU corresponding to 13 tones may be provided on each of left and right sides of the DC band. Each RU may be allocated for a receiving device, that is, a user.

For example, the RU arrangement of FIG. 9A may be used for a situation for an SU as well as a situation for a MU. Therefore, as illustrated in the uppermost portion of FIG. 9A, a plurality of 26-tone RUs may be arranged and, as illustrated in the lowermost portion of FIG. 9A, one 242-tone RU including 242L and 242R may be arranged (in this case, three DC tones may be inserted into the central band).

Various sizes of RUs, that is, the 26-tone RUs, the 52-tone RUs, the 106-tone RUs, and the 242-tone RU are suggested in an example of FIG. 9A. In other examples, the sizes of the RUs may differ.

Referring to FIG. 9B, RUs in FIG. 9A may be indexed sequentially from the lowest frequency. For example, the 26-tone RU may be indexed as first to ninth RUs RU1 to RU9, the 52-tone RU may be indexed as first to fourth RUs RU1 to RU4, the 106-tone RU may be indexed as first and second RUs RU1 and RU2, and 242-tone RU may be indexed as a first RU RU1. A fifth RU is a central 26-tone RU in FIG. 9B.

As shown in FIG. 10A, the arrangement of the RU available in the 40 MHz OFDMA PPDU is illustrated. In the leftmost band of a 40 MHz band, 12 tones (that is, subcarriers) may be used as a guard band and, in the rightmost band of the 40 MHz band, 11 tones may be used as a guard band. In addition, five DC tones may be inserted into a central band, that is, a DC band. In addition, 26-tone RUs, 52-tone RUs, 106-tone RUs, and 242-tone RUs may be allocated for other bands. Each RU may be allocated for a receiving device, that is, a user.

Note that the RU arrangement of FIG. 10A may be used for a situation for a SU as well as a situation for a MU. Therefore, as illustrated in the lowermost portion of FIG. 10, one 484-tone RU including 484L and 484R may be arranged (in this case, five DC tones may be inserted into the central band).

Various sizes of RUs, that is, the 26-tone RUs, the 52-tone RUs, the 106-tone RUs, the 242-tone RUs, and the 484-tone RU are suggested in an example of FIG. 10A. In other examples, the sizes of the RUs may differ.

Referring to FIG. 10B, RUs in FIG. 10A may be indexed sequentially from the lowest frequency. For example, the 26-tone RU may be indexed as first to 18th RUs RU1 to RU18, the 52-tone RU may be indexed as first to eighth RUs RU1 to RU8, the 106-tone RU may be indexed as first to fourth RUs RU1 to RU4, the 242-tone RU may be indexed as first and second RUs RU1 and RU2, and the 484-tone RU may be indexed as a first RU RU1.

In FIG. 11A, the arrangement of the RU available in the 80 MHz OFDMA PPDU is illustrated.

Specifically, in the leftmost band of an 80 MHz band, 12 tones (that is, subcarriers) may be used as a guard band and, in the rightmost band of the 80 MHz band, 11 tones may be used as a guard band. In addition, 26-tone RUs, 52-tone RUs, 106-tone RUs, 242-tone RUs, and 484-tone RUs may be allocated for other bands. Each RU may be allocated for a receiving device, that is, a user.

The RU arrangement of FIG. 11A may be used for a situation involving an SU as well as one involving an MU. Therefore, as illustrated in the lowermost portion of FIG. 11A, one 996-tone RU including 996L and 996R may be arranged (in this case, five DC tones may be inserted into the central band).

Various sizes of RUs, that is, the 26-tone RU ("RU26"), the 52-tone RU ("RU52"), the 106-tone RU ("RU106"), the 242-tone RU ("RU242"), the 484-tone RU ("RU484"), and the 996-tone RU ("RU996") are suggested in an example of FIG. 11A. However, the RU sizes may differ in other embodiments.

Referring to FIG. 11B, RUs in FIG. 11A may be indexed sequentially from the lowest frequency. For example, the 26-tone RU may be indexed as first to 37th RUs RU1 to RU37, the 52-tone RU may be indexed as first to 16th RUs RU1 to RU16, the 106-tone RU may be indexed as first to eighth RUs RU1 to RU8, the 242-tone RU may be indexed first to fourth RUs RU1 to RU4, the 484-tone RU may be indexed as first and second RUs RU1 and RU2, and the 996-tone RU may be indexed as a first RU RU1. The central 26-tone RU may be used in HE (i.e., 802.11ax) but may not be used in EHT (i.e., 802.11be). In some embodiments, as illustrated in FIG. 11B, The central 26-tone RU may be indexed as a 19th RU RU19. Accordingly, an indexing of RU in EHT may be compatible with an indexing of RU in HE.

Referring FIGS. 12A and 12B, RUs in 160 MHz OFDM PPDU may be indexed sequentially from the lowest frequency. For example, the 26-tone RU may be indexed as first to 74th RUs RU1 to RU74. As described with reference to FIG. 11B, the central 26-tone RU in 20 MHz bandwidth may not be used. Accordingly, the 19th RU RU19 and the 56th RU RU56 may not be used.

Referring to FIGS. 13A, 13B, 13C, 13D and 13E, RUs in 320 MHz bandwidth may be indexed sequentially from the lowest frequency. For example, the 26-tone RU may be indexed as first to 148th RUs RU1 to RU148. As described with reference to FIG. 11B, the central 26-tone RU in 20 MHz bandwidth. Accordingly, the 19th RU RU19, the 56th RU RU56 and the 93th RU RU93 in FIGS. 13A and 13B may not be used.

In some embodiments, RU positions available in the 40 MHz OFDMA PPDU are the same as two replicas of RU positions available in the 20 MHz OFDMA PPDU. In addition, RU positions available in the 80 MHz OFDMA PPDU may be the same as two replicas of the RU positions available in the 40 MHz OFDMA PPDU. In addition, RU positions available in the 160 MHz OFDMA PPDU may be the same as two replicas of the RU positions available in the 80 MHz OFDMA PPDU. In addition, RU positions available in the 320 MHz OFDMA PPDU may be the same as two replicas of the RU positions available in the 160 MHz OFDMA PPDU. Accordingly, in 160MH bandwidth, the 52-tone RU may be indexed as first to 32th RUs RU1 to RU32, the 106-tone RU may be indexed as first to 16th RUs RU1 to RU16, the 242-tone RU may be indexed as first to 8 RUs RU1 to RU8, the 484-tone RU may be indexed as first to fourth RUs RU1 to RU4, and the 996-tone RU may be indexed as first and second RUs RU1 and RU2. Similarly, in 320 MHz bandwidth, the 52-tone RU may be indexed as first to 64 RUs RU1 to RU64, the 106-tone RU may be indexed as first to 32 RUs RU1 to RU32, the 242-tone RU may be indexed a s first to 16th RUs RU1 to RU16, the 484-tone RU may be indexed as first to eighth RUs RU1 to RU8, and the 996-tone RU may be indexed as first to fourth RUs RU1 to RU4.

As described above, at least one RU may be variously arranged in a frequency domain of a data field.

Figure 14:
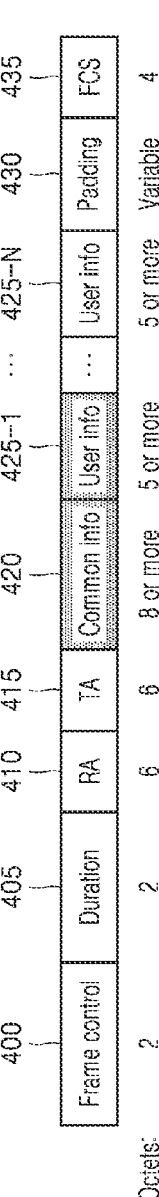
FIG. 14 is a view illustrating a structure of a trigger frame.

FIG. 14 is a view illustrating a structure of a trigger frame. For example, when a UL transmission is to be performed by one or more STAs to an AP, the AP may allocate different frequency resources for the one or more STAs as UL transmission resources based on OFDMA. Here, an example of the frequency resource is an RU, which may be indicated by a trigger frame transmitted by the AP to the STA before the UL transmission.

Therefore, to transmit the HE TB PPDU of FIG. 5 or EHT TB PPDU of FIG. 7, a trigger frame as illustrated in FIG. 14 is first transmitted to the STA. The trigger frame may set uplink bandwidth and allocate the RU for UL multiple-user transmission. The trigger frame may be formed of a MAC (media access control) frame and may be included in a PPDU.

The trigger frame may be transmitted through the PPDU illustrated in FIGS. 3 to 8 or a PPDU specially designed for the corresponding trigger frame. For example, when the trigger frame is transmitted through the PPDU illustrated in FIGS. 3 to 8, the trigger frame may be included in the data field.

As illustrated in FIG. 14, a trigger frame may include a frame control field 400 (2 octets), a duration field 405 (2 octets), an RA (recipient address) field 410 (6 octets), a TA (transmitting address) field 415 (6 octets), a common information field 420 (no less than 8 octets), individual user information fields 425-1 to 425-N (N is a natural number of 1 or more, and each information field is 5 or more octets), a padding field 430, and a frame check sequence (FCS) field 435 (no less than 4 octets).

The frame control field 400 may include information on a version of a MAC protocol and other additional control information items. The duration field 405 may include time information for setting a network allocation vector (NAV) or information on an identifier (e.g., an association ID (AID)) of a terminal. The RA field 410 may include address information of the receiving device of the corresponding trigger frame and may be omitted when unnecessary. The TA field 415 may include address information of a transmitting device transmitting the corresponding trigger frame.

In the TA field 415, a field indicating a length of an L-SIG field of a UL PPDU transmitted to the corresponding trigger frame or information controlling a content of an SIG-A field (that is, the HE-SIG-A field) of the UL PPDU transmitted to the corresponding trigger frame may be included. In addition, in the TA field 415, as common control information, information on a length of a CP of the UL PPDU transmitted to the corresponding trigger frame or information on a length of an LTF field may be included.

The common information field 420 may include common information for receiving devices (for example, STA) receiving the corresponding trigger frame. The trigger frame may include the individual user information fields 425-1 to 425-N (N is a natural number of no less than 1) corresponding to the number of receiving devices receiving the trigger frame. For reference, the individual user information fields may be referred to as "user info list field". The trigger frame may include the padding field 430 and the FCS field 435.

In other examples, some fields of the trigger frame may be omitted and other fields may be added. Further, a length of each field may be different from those illustrated.

An embodiment of the inventive concept relates to a method and apparatus for supporting MU communication using OFDMA. APs may allocate at least one RU for at least one of a plurality of receiving devices (e.g., STAs) through the OFDMA in an extended bandwidth. A method and apparatus for providing a trigger frame including information about an uplink bandwidth and at least one RU allocated the receiving device will be described later. In addition, a method and apparatus for identifying the uplink bandwidth and the allocated at least one RU from the trigger frame will be described. For example, as described later with reference to FIG. 17, the AP may allocate at least one RU to at least one STA, generate a trigger frame for uplink transmission, and transmit the generated trigger frame to the at least one STA. The STA may receive the trigger frame from the AP, identify at least one RU allocated to the STA for uplink OFDMA, transmit data, e.g., a PPDU, to the AP based on the identified at least one RU. However, an embodiment of the inventive concept may be applied to a case where the STA transmits data to another STA and a case where the AP transmits data to the STA. In addition, an embodiment of the inventive concept may be applied to a circumstance supporting a single RU as well as downlink OFDMA and uplink OFDMA. Information about uplink bandwidth and RU allocated to the receiving device may be provided to the receiving device by the common info field 420 and the user info field of the trigger frame. Hereinafter, the common info field 420 and the user info field will be described with reference to FIGS. 15, 16A and 16B.

Figure 15:
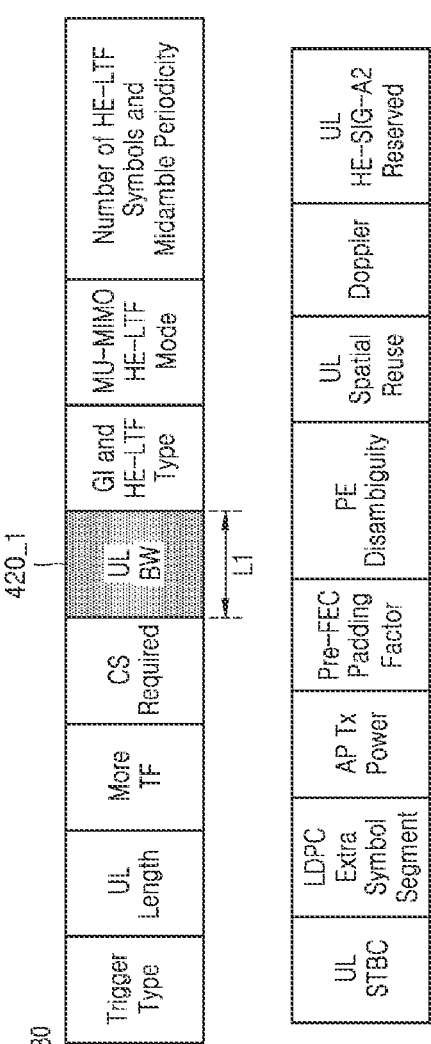
FIG. 15 is a diagram illustrating an example of a common information field.
Figure 16A:
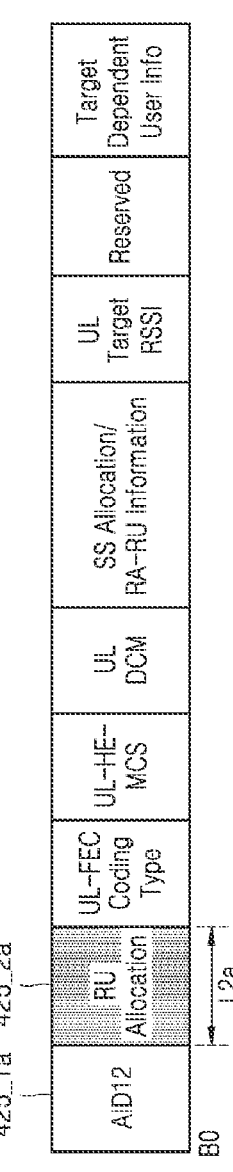
FIGS. 16A and 16B are diagrams illustrating respective examples of a user information field.
Figure 16B:
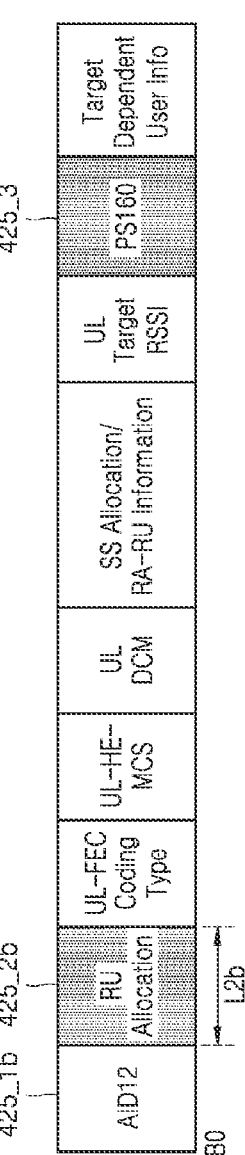

FIG. 15 is a diagram illustrating an example of a common information field, which contains information commonly applicable to multiple STAs. FIGS. 16A and 16B are diagrams illustrating respective examples of a user information field.

Referring to FIG. 15, the common information field may include a sequence of subfields from a first subfield 151 to a last subfield 168. A STA may set a value of an uplink bandwidth subfield 420_1 among the plurality of subfields included in the common information field, and the STA may identify an uplink bandwidth based on the value of the uplink bandwidth subfield 420_1. The uplink bandwidth subfield 420_1 may have a length L1 for defining various uplink bandwidths. For example, a length L1 of the uplink bandwidth subfield 420_1 in HE may be 2 bits to indicate one of 20 MHz, 40 MHz, 80 MHz, and 160 MHz. In EHT, the length L1 of the uplink bandwidth subfield 420_1 may be at least 3 bits to indicate one of four bandwidths supported by the HE as well as an extended bandwidth, e.g., bandwidths up to 320 MHz. Herein, the uplink bandwidth may be simply referred to as a bandwidth unless otherwise stated. In other examples, the common information field includes a field(s) not shown in FIG. 15, and/or at least one field shown in FIG. 15 may be omitted from the common information field.

Referring to FIG. 16A, a first example of a user information field may include subfields such as an AID12 field 425_1a and an RU allocation subfield 425_2a. To specify the STA, an AP may set a value of the AID12 field 425_1a, and the STA may identify that the user information field is the user information field of the STA based on the value of the AID12 field 425_1a. In addition, to define at least one allocated RU, the AP may set a value of the RU allocation subfield 425_2a, and the STA may identify the at least one RU, which is allocated to the STA, based on the value of the RU allocation subfield 425_2a.

The RU allocation subfield 425_2a may have a length L2a for defining various RU allocations. For example, the length L2a of the RU allocation subfield 425_2a in the HE may be 8 bits to indicate a single RU allocable to the STA within a bandwidth of up to 160 MHz. However, in EHT, the RU allocation subfield 425_2a may indicate not only the single RU allocable to the STA within the bandwidth of up to 320 MHz, but also a multi-RU, and accordingly, a length of an RU allocation subfield 426_2a may be longer than at least 8 bits. The RU allocation subfield 425_2a for EHT may have a length of 9 bits, as will be described later with reference to FIG. 28A.

Referring to FIG. 16B, the user information field may include a plurality of subfields including an AID12 field 425_1b and an RU allocation subfield 425_2b. In addition, the user information field may further include a PS160 subfield 425_3 indicating a primary subband or a secondary subband, as shown in FIG. 16B. Although the PS160 subfield 425_3 is shown in FIG. 16B to correspond to a reserved area (e.g., B39) of the user information field of FIG. 16A, in other examples, the PS160 subfield 425_3 may be disposed in a different position from that shown in FIG. 16B.

Figure 17:
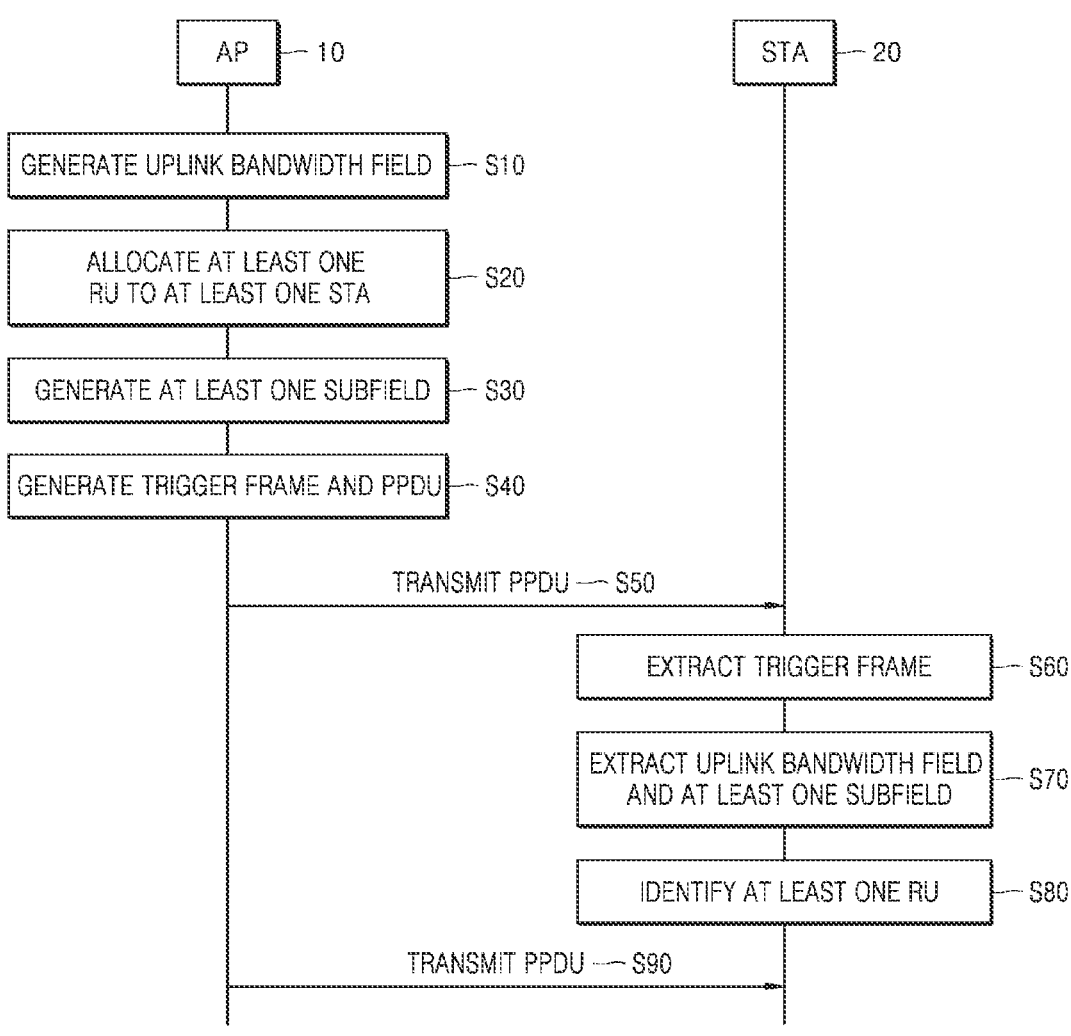
FIG. 17 is a message flow diagram illustrating a method of communication based on an extended bandwidth and a multi-RU according to an embodiment.

As will be described later with reference to FIG. 28B, the PS160 subfield 425_3 may be used to define various RU allocations together with the RU allocation subfield 425_2b, and accordingly, a length L2b of the RU allocation subfield 425_2b may be shorter than the length L2a of FIG. 16A. For example, the length L2b of the RU allocation subfield 425_2b may be 8 bits. To define the at least one allocated RU, the AP may set values of the RU allocation subfield 425_2b and the PS160 subfield 425_3, and the STA may identify the at least one RU, which is allocated to the STA, based on the values of the RU allocation subfield 425_2b and the PS160 subfield 425_3. FIG. 17 is a message flow diagram illustrating a method of communication based on an extended bandwidth and a multi-RU according to an embodiment. FIG. 17 shows examples of operations of an AP 10 and a STA in communication with each other. The AP 10 may communicate with at least one STA including the STA 20 included in a coverage area.

Referring to FIG. 17, in operation S10, the AP 10 may generate an uplink bandwidth field. For example, the AP 10 may determine a bandwidth to be used by at least one STA including the STA 20 in uplink transmission. As described above with reference to FIG. 15, in EHT, the uplink bandwidth field may have a length of at least 3 bits, and the AP 10 may determine a bandwidth of one of 20 MHz, 40 MHz, 80 MHz, 160 MHz, and 320 MHz, and set the uplink bandwidth field to a value corresponding to the determined bandwidth.

In operation S20, the AP 10 may allocate at least one RU to the at least one STA. For example, the AP 10 may allocate a single RU to the STA 20 or may allocate a multi-RU to the STA 20. For EHT, AP 10 may allocate a single RU to the STA 20 in the same way as is done in HE. Examples in which the AP 10 allocates a multi-RU to the STA 20 in a given bandwidth in EHT will be described later with reference to FIGS. 18 to 25C.

In operation S30, the AP 10 may generate at least one subfield. For example, the AP may generate at least one subfield included in a trigger frame based on the at least one RU allocated in operation S20. As described above with reference to FIG. 16A, an RU allocation subfield in EHT may have a length of at least 9 bits, and in operation S30, the AP 10 may set the RU allocation subfield as a value corresponding to the allocated at least one RU. In other examples, as described above with reference to FIG. 16B, the RU allocation subfield in EHT may have a length of 8 bits, the user information field may include a PS160 subfield, and in operation S30, the AP 10 may set the RU allocation subfield and the PS160 subfield as values corresponding to the at least one allocated RU. An example of operation S30 will be described later with reference to FIG. 26.

In operation S40, the AP 10 may generate a trigger frame and a PPDU. For example, the AP 10 may generate a common information field including the uplink bandwidth field generated in operation S10 and a user information field including the at least one subfield generated in operation S30. The AP 10 may generate the trigger frame including the common information field and the user information field, and may generate the PPDU including the trigger frame.

In operation S50, the AP 10 may transmit the PPDU, and the STA 20 may receive the PPDU. In operation S60, the STA 20 may extract the trigger frame. The STA 20 may extract the trigger frame from the PPDU received in operation S50.

In operation S70, the STA 20 may extract the uplink bandwidth field and the at least one subfield. The STA 20 may extract the common information field and the user information field from the trigger frame extracted in operation S60. The STA 20 may extract the uplink bandwidth field having a length of at least 3 bits from the common information field, identify a user information field of the STA 20 based on an AID12 field, and extract the at least one subfield from the identified user information field.

In operation S80, the STA 20 may identify the at least one RU. The STA 20 may identify the bandwidth based on the uplink bandwidth field extracted in operation S70, and identify the at least one RU, which is allocated to the STA 20, based on the identified bandwidth and the at least one subfield extracted in operation S70. An example of operation S80 will be described later with reference to FIG. 27.

In operation S90, the STA 20 may transmit the PPDU, and the AP 10 may receive the PPDU. The STA 20 may perform uplink transmission on the at least one RU identified in operation S80 and may transmit the PPDU to the STA 20. The AP 10 may receive the PPDU on the at least one RU allocated to the STA 20 within the bandwidth.

FIG. 18 shows small-size multi-RUs allocable to a STA in an OFDMA 20 MHz EHT PPDU according to an embodiment. Specifically, the table of FIG. 18 shows indexes and combinations of the small-size multi-RUs allocable in a bandwidth of 20 MHz. As described later with reference to FIGS. 29A and 29B, values of RU allocation subfields may increase in the order of the indexes shown in FIG. 18. In FIG. 18, the indexes of a single RU may correspond to indexes shown in FIG. 9B.

Referring to FIG. 18, the multi-RUs including a 52-tone RU and a 26-tone RU may have three different combinations, and may be indexed as first to third multi-RUs MRU1 to MRU3. As shown in FIG. 18, the first multi-RU MRU1 may include a second 52-tone RU and a second 26-tone RU, the second multi-RU MRU2 may include a second 52-tone RU and a fifth 26-tone RU, and the third multi-RU MRU3 may include a third 52-tone RU and an eighth 26-tone RU.

A multi-RU including a 106-tone RU and a 26-tone RU may have two different combinations, and may be indexed as the first and second multi-RUs MRU1 and MRU2. As shown in FIG. 18, the first multi-RU MRU1 may include a first 106-tone RU and a fifth 26-tone RU, and the second multi-RU MRU2 may include a second 106-tone RU and the fifth 26-tone RU.

FIG. 19 shows small-size multi-RUs allocable to a STA in an OFDMA 40 MHz EHT PPDU according to an embodiment. Specifically, the table of FIG. 19 shows indexes and combinations of the small-size multi-RUs allocable in a bandwidth of 40 MHz. In some embodiments, as described later with reference to FIGS. 29A and 29B, values of RU allocation subfields may increase in the order of the indexes illustrated in FIG. 19. In FIG. 19, the indexes of a single RU may correspond to the indices shown in FIG. 10B.

Referring to FIG. 19, the multi-RUs including a 52-tone RU and a 26-tone RU may have six different combinations, and may be indexed as first to sixth multi-RUs MRU1 to MRU6. As shown in FIG. 19, the first multi-RU MRU1 may include a second 52-tone RU and a second 26-tone RU, the second multi-RU MRU2 may include a second 52-tone RU and a fifth 26-tone RU, the third multi-RU MRU3 may include a third 52-tone RU and an eighth 26-tone RU, the fourth multi-RU MRU4 may include a sixth 52-tone RU and an 11th 26-tone RU, the fifth multi-RU MRU5 may include a sixth 52-tone RU and a 14th 26-tone RU, and the sixth multi-RU MRU6 may include a 7th 52-tone RU and a 17th 26-tone RU.

A multi-RU including a 106-tone RU and a 26-tone RU may have four different combinations, and may be indexed as the first to fourth multi-RUs MRU1 to MRU4. As shown in FIG. 19, the first multi-RU MRU1 may include a first 106-tone RU and a fifth 26-tone RU, the second multi-RU MRU2 may include a second 106-tone RU and the fifth 26-tone RU, the third multi-RU MRU3 may include a third 106-tone RU and a 14th 26-tone RU, and the fourth multi-RU MRU4 may include a fourth 106-tone RU and the 14th 26-tone RU.

FIG. 20 shows small-size multi-RUs allocable to a STA in an OFDMA 80 MHz EHT PPDU according to an embodiment. Specifically, the table of FIG. 20 shows indexes and combinations of the small-size multi-RUs allocable in a bandwidth of 80 MHz. In some embodiments, as described later with reference to FIGS. 29A and 29B, values of RU allocation subfields may increase in the order of the indexes shown in FIG. 20. In FIG. 20, the indexes of a single RU may correspond to indices shown in FIG. 11B.

Referring to FIG. 20, the multi-RUs including a 52-tone RU and a 26-tone RU may have 12 different combinations, and may be indexed as first to twelfth multi-RUs MRU1 to MRU12. As shown in FIG. 20, the first multi-RU MRU1 may include a second 52-tone RU and a second 26-tone RU, the second multi-RU MRU2 may include the second 52-tone RU and a fifth 26-tone RU, the third multi-RU MRU3 may include a third 52-tone RU and an eighth 26-tone RU, the fourth multi-RU MRU4 may include a sixth 52-tone RU and an 11th 26-tone RU, the fifth multi-RU MRU5 may include the sixth 52-tone RU and a 14th 26-tone RU, and the sixth multi-RU MRU6 may include a 7th 52-tone RU and a 17th 26-tone RU. In addition, the seventh multi-RU MRU7 may include a 10th 52-tone RU and a 21st 26-tone RU, the eighth multi-RU MRU8 may include the 10th 52-tone RU and a 24th 26-tone RU, the ninth multi-RU MRU9 may include an 11th 52-tone RU and a 27th 26-tone RU, the 10th multi-RU MRU10 may include a 14th 52-tone RU and a 30th 26-tone RU, the eleventh multi-RU MRU11 may include the 14th 52-tone RU and a 33rd 26-tone RU, and the 12th multi-RU MRU6 may include a 15th 52-tone RU and a 36th 26-tone RU.

A multi-RU including a 106-tone RU and a 26-tone RU may have eight different combinations, and may be indexed as the first to eighth multi-RUs MRU1 to MRU8. As shown in FIG. 19, the first multi-RU MRU1 may include a first 106-tone RU and a fifth 26-tone RU, the second multi-RU MRU2 may include a second 106-tone RU and the fifth 26-tone RU, the third multi-RU MRU3 may include a third 106-tone RU and a 14th 26-tone RU, and the fourth multi-RU MRU4 may include a fourth 106-tone RU and the 14th 26-tone RU. In addition, the fifth multi-RU MRU5 may include a fifth 106-tone RU and a 24th 26-tone RU, the sixth multi-RU MRU6 may include a sixth 106-tone RU and the 24th 26-tone RU, the seventh multi-RU MRU7 may include a seventh 106-tone RU and a 33rd 26-tone RU, and the eighth multi-RU MRU8 may include an eighth 106-tone RU and the 33rd 26-tone RU.

Like the multi-RUs including 52-tone RUs and 26-tone RUs and the multi-RUs including 106-tone RUs and 26-tone RUs, a multi-RU including only small-size RUs (i.e., a 26-tone RU, a 52-tone RU, and a 106-tone RU) may be referred to as a small-size multi-RU. In some embodiments, only some of the small-size multi-RUs may be used in a bandwidth equal to or greater than 80 MHz. For example, as shown in FIG. 20, some (i.e., MRU1, MRU6, MRU7, and MRU12) of the multi-RUs including 52-tone RUs and 26-tone RUs and some (i.e., MRU2, MRU3, MRU6, and MRU7) of the multi-RUs including 106-tone RUs and 26-tone RUs may not be used in the bandwidth equal to or greater than 80 MHz.

FIGS. 21A and 21B show small-size multi-RUs allocable to a STA in an OFDMA 160 MHz EHT PPDU according to an embodiment. Specifically, the tables of FIGS. 21A and 21B show indexes and combinations of the small-size multi-RUs allocable in a bandwidth of 160 MHz. In some embodiments, as described later with reference to FIGS. 29A and 29B, values of RU allocation subfields may increase in the order of the indexes shown in FIGS. 21A and 21B.

Referring to FIG. 21A, the multi-RUs including 52-tone RUs and 26-tone RUs may have 24 different combinations, and may be indexed as first to 24th multi-RUs MRU1 to MRU24. Referring to FIG. 21B, the multi-RU including a 106-tone RU and a 25-tone RU may have 16 different combinations, and may be indexed as the first to sixteenth multi-RUs MRU1 to MRU16.

FIGS. 22A, 22B, and 22C show small-size multi-RUs allocable to a STA in an OFDMA 320 MHz EHT PPDU according to an embodiment. Specifically, the tables of FIGS. 22A, 22B, and 22C show indexes and combinations of small-size multi-RUs allocable in a bandwidth of 320 MHz. In some embodiments, as described later with reference to FIGS. 29A and 29B, values of RU allocation subfields may increase in the order of the indexes illustrated in FIGS. 22A, 22B, and 22C.

Referring to FIGS. 22A and 22B, the multi-RU including a 52-tone RU and a 26-tone RU may have 48 different combinations, and may be indexed as first to 48th multi-RUs MRU1 to MRU48. Referring to FIG. 22C, the multi-RU including a 106-tone RU and a 25-tone RU may have 32 different combinations, and may be indexed as the first to 32nd multi-RUs MRU1 to MRU32.

FIG. 23 shows large-size multi-RUs allocable to a STA in an OFDMA 80 MHz EHT PPDU according to an embodiment. Specifically, the table of FIG. 23 shows indexes and combinations of the large-size multi-RUs allocable in a bandwidth of 80 MHz. In some embodiments, as described later with reference to FIGS. 29A and 29B, values of RU allocation subfields may increase in the order of the indexes shown in FIG. 23.

Referring to FIG. 23, the multi-RUs including 484-tone RUs and 242-tone RUs may have four different combinations, and may be indexed as the first to fourth multi-RUs MRU1 to MRU4.

FIG. 24 shows large-size multi-RUs allocable to a STA in an OFDMA 160 MHz EHT PPDU according to an embodiment. Specifically, the table of FIG. 24 shows indexes and combinations of large-size multi-RUs allocable in a bandwidth of 160 MHz. In some embodiments, as described later with reference to FIGS. 29A and 29B, values of RU allocation subfields may increase in the order of the indexes illustrated in FIG. 24.

Referring to FIG. 24, the multi-RU including 484-tone RUs and 242-tone RUs may have eight different combinations and may be indexed as the first to eighth multi-RUs MRU1 to MRU8. In a bandwidth of 160 MHz, four 484-tone RUs may be sequentially arranged, and eight 242-tone RUs may be sequentially arranged. As shown in FIG. 24, the first to eighth multi-RUs may respectively correspond to combinations of sequentially unallocated eight 242-tone RUs.

The multi-RUs including 996-tone RUs and 484-tone RUs may have four different combinations, and may be indexed as the first to fourth multi-RUs MRU1 to MRU4. In a bandwidth of 160 MHz, two 996-tone RUs may be sequentially arranged, and four 484-tone RUs may be sequentially arranged. As shown in FIG. 24, the first to fourth multi-RUs MRU1 to MRU4 may respectively correspond to combinations of sequentially unallocated four 484-tone RUs.

The multi-RUs including 996-tone RUs, 484-tone RUs, and 242-tone RUs may have 8 different combinations, and may be indexed as the first to eighth multi-RUs MRU1 to MRU8. In a bandwidth of 160 MHz, two 996-tone RUs may be sequentially arranged, four 484-tone RUs may be sequentially arranged, and eight 242-tone RUs may be sequentially arranged. As shown in FIG. 24, the first to eighth multi-RUs MRU1 to MRU8 may respectively correspond to combinations of sequentially unallocated eight 242-tone RUs.

FIGS. 25A, 25B, and 25C show large-size multi-RUs allocable to a STA in an OFDMA 320 MHz EHT PPDU according to an embodiment. Specifically, FIGS. 25A, 25B, and 25C show separate tables for illustration purposes, and the tables of FIGS. 25A, 25B and show indexes and combinations of the large-size multi-RUs allocable in a bandwidth of 320 MHz. In some embodiments, as described later with reference to FIGS. 29A and 29B, values of RU allocation subfields may increase in the order of the indexes shown in FIGS. 25B, and 25C.

Referring to FIG. 25A, multi-RUs including 484-tone RUs and 242-tone RUs may have 16 different combinations, and may be indexed as the first to sixteenth multi-RUs MRU1 to MRU16. In a bandwidth of 320 MHz, eight 484-tone RUs may be sequentially arranged, and sixteen 242-tone RUs may be sequentially arranged. As shown in FIG. 25A, the first to sixteenth multi-RUs may respectively correspond to combinations of sequentially unallocated sixteen 242-tone RUs.

The multi-RUs including 996-tone RUs and 484-tone RUs may have eight different combinations, and may be indexed as the first to eighth multi-RUs MRU1 to MRU8. In a bandwidth of 320 MHz, four 996-tone RUs may be sequentially arranged, and eight 484-tone RUs may be sequentially arranged. As shown in FIG. 25A, the first to eighth multi-RUs MRU1 to MRU8 may respectively correspond to combinations of sequentially unallocated eight 484-tone RUs.

Referring to FIG. 25B, multi-RUs including 996-tone RUs, 484-tone RUs, and 242-tone RUs may have 16 different combinations, and be indexed as the first to sixteenth multi-RUs MRU1 to MRU16. In a bandwidth of 320 MHz, four 996-tone RUs may be sequentially arranged, eight 484-tone RUs may be sequentially arranged, and sixteen 242-tone RUs may be sequentially arranged. As shown in FIG. 25B, the first to sixteenth multi-RUs MRU1 to MRU16 may respectively correspond to combinations of sequentially unallocated sixteen 242-tone RUs.

A multi-RU including two 996-tone RUs and 484-tone RUs may have 12 different combinations, and may be indexed as the first to twelfth multi-RUs MRU1 to MRU12. In a bandwidth of 320 MHz, the first to fourth 996-tone RUs may be sequentially arranged and the first to eighth 484-tone RUs may be sequentially arranged. As shown in FIG. 25B, the first to fifth multi-RUs MRU1 to MRU6 may respectively correspond to combinations of the sequentially unallocated first to sixth 484-tone RUs while the fourth 996-tone RU is not allocated. In addition, the seventh to twelfth multi-RUs MRU7 to MRU12 may respectively correspond to combinations of the sequentially unallocated third to eighth 484-tone RUs while the first 996-tone RU is not allocated.

Referring to FIG. 25C, a multi-RU including three 996-tone RUs may have four different combinations, and may be indexed as the first to fourth multi-RUs MRU1 to MRU4. In a 320 MHz bandwidth, four 996-tone RUs may be sequentially arranged, and as shown in FIG. 25C, the first to fourth multi-RUs MRU1 to MRU4 may respectively correspond to combinations of sequentially unallocated four 996-tone RUs.

A multi-RU including three 996-tone RUs and a 484-tone RU may have 8 different combinations, and may be indexed as the first to eighth multi-RUs MRU1 to MRU8. In a 320 MHz bandwidth, four 996-tone RUs may be sequentially arranged and eight 484-tone RUs may be sequentially arranged. As shown in FIG. 25C, the first to eighth multi-RUs MRU1 to MRU8 may respectively correspond to combinations of sequentially unallocated eight 484-tone RUs.

In EHT, a user information field may define not only single RUs of HE but also the multi-RUs described above with reference to FIGS. 18 to 25C. Hereinafter, examples of the user information field defining single RUs and multi-RUs in an extended bandwidth of EHT will be described.

Figure 26:
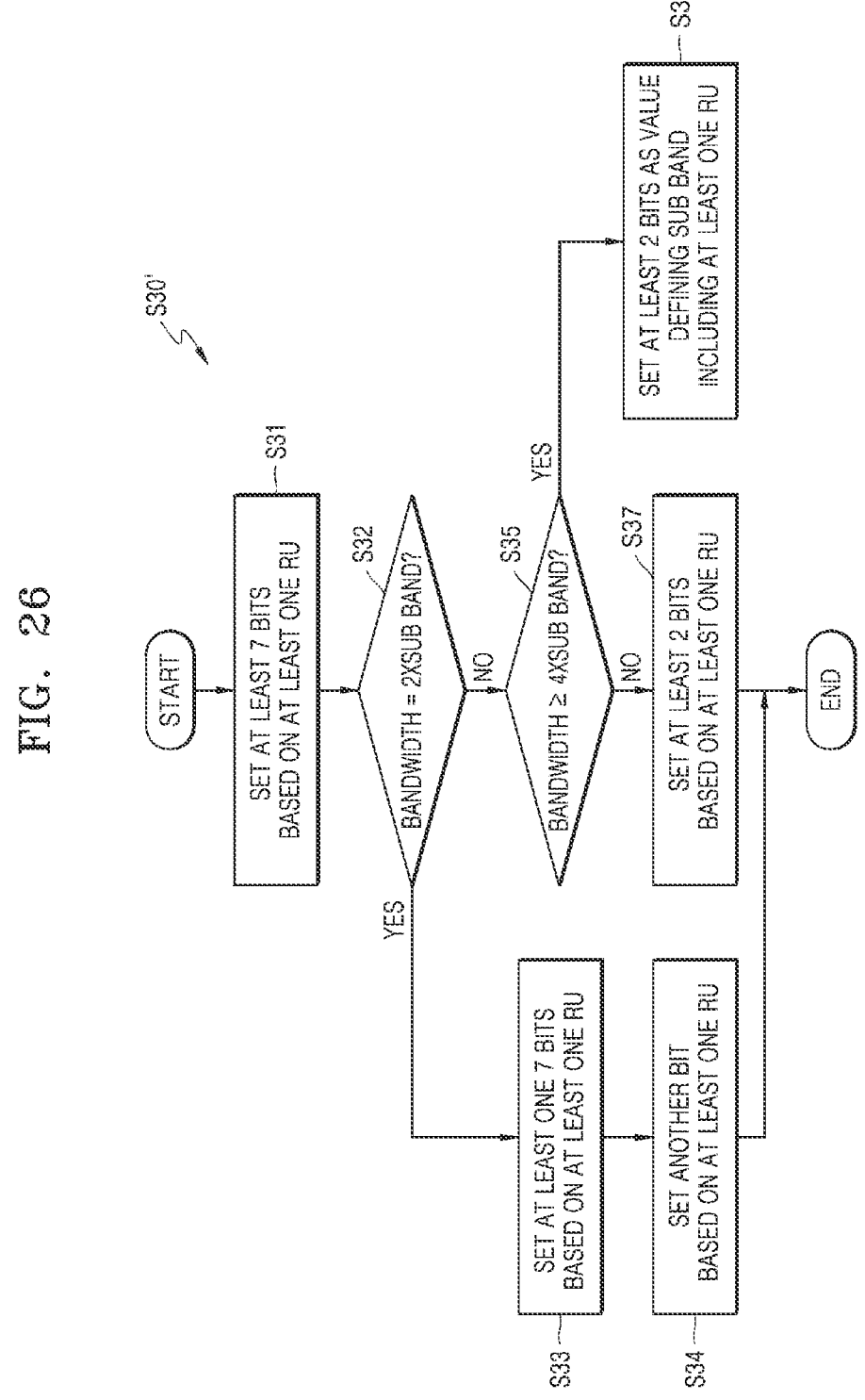
FIG. 26 is a flowchart illustrating a method of communication based on an extended bandwidth and a multi-RU according to an embodiment.

FIG. 26 is a flowchart illustrating a method of communication based on an extended bandwidth and multi-RUs according to an embodiment. Specifically, FIG. 26 shows an example of operation S30 of FIG. 17. As described above with reference to FIG. 17, the AP may generate at least one subfield in operation S30' of FIG. 26. Nine bits or more included in a user information field may be used to define at least one RU allocated in EHT. As described above with reference to FIG. 16A, an RU allocation subfield may have a length of 9 bits, and the 9 bits may include a first group of 7 bits and a second group of 2 bits to be described later. In other examples, as described above with reference to FIG. 16B, the RU allocation subfield may have a length of 8 bits, and the 8 bits may include at least 7 bits to be described later. The group of at least 2 bits to be described later may include one bit of the RU allocation subfield and one bit of a PS160 subfield. As shown in FIG. 26, operation S30' may include a plurality of operations S31 to S37, which will be described with reference to FIG. 17.

Referring to FIG. 26, in operation S31, the AP 10 may set "K" bits, where the K is at least 7 and the K bits are associated with at least one RU. For example, the AP 10 may set K bits of the RU allocation subfield in association with the at least one RU allocated to the STA in operation S20 of FIG. 17. The at least one RU may be defined in a subband with only the K bits, or may be defined based on at least one bit of the M bits (where M is at least two) described later, as well as the K bits. The M bits of the user information field may be set in operations (i.e., S32 to S37) following operation S31.

In operation S32, the AP 10 may determine whether the bandwidth corresponds to two subbands. Herein, a subband may refer to a minimum frequency band including the at least one RU allocated to the STA 20, that is, a frequency band including a channel, and may have a width of e.g., 80 MHz, 160 MHz, or 320 MHz. Herein, the subband may be simply referred to in terms of its width. Accordingly, the cases where the bandwidth corresponds to two subbands in EHT may include a case where the subband is 80 MHz in a bandwidth of 160 MHz and the case where the subband is 160 MHz in a bandwidth of 320 MHz. When the bandwidth includes a plurality of subbands, the plurality of subbands may include a primary subband and at least one secondary subband. Management and control information may be transmitted in a primary subband but may not be transmitted in a secondary subband.

When the bandwidth corresponds to two subbands, in operation S33, the AP 10 may set one bit as a value defining a subband including at least one RU, and in operation S34, the AP 10 may set another bit associated with the at least one RU. That is, one of the M=2 bits of the user information field may represent one of the two subbands, and the other of the M=2 bits may define the at least one RU along with the K bits. (Since the K bits and the M bits collectively define the at least one RU, each of the K bits and the M bits are associated with the at least one RU.)

When the bandwidth does not correspond to two subbands, in operation S35, the AP may determine whether the bandwidth corresponds to four or more subbands. For example, cases where the bandwidth corresponds to four subbands in EHT may include a case where the subband is 80 MHz in a bandwidth of 320 MHz.

When the bandwidth includes four or more subbands, in operation S36, the AP 10 may set the M bits as a value defining a subband including at least one RU. For example, the value may be a decimal value defined by the binary sequence of the M bits. Accordingly, the M bits of the user information field may define one of four or more subbands including at least one RU defined in part by the K bits set in operation S31.

When the bandwidth does not include four or more subbands, e.g., when the bandwidth includes a single subband, in operation S37, the AP 10 may set the M bits associated with the at least one RU. For example, the cases where the bandwidth includes the single subband in EHT includes the case where the bandwidth is 20 MHz, 40 MHz, or 80 MHz, the case where the subband is 160 MHz in the bandwidth of 160 MHz, and the case where the subband is 320 MHz in the bandwidth of 320 MHz.

FIG. 27 is a flowchart illustrating a method of communication based on an extended bandwidth and multi-RUs according to an embodiment. Specifically, FIG. 27 shows an example of operation S80 of FIG. 17. As described above with reference to FIG. 17, in operation S80' of FIG. 27, the STA 20 may identify at least one RU allocated to the STA 20. In some embodiments, as described above with reference to FIG. 16A, an RU allocation subfield may have a length of 9 bits, and 9 bits may include at least 7 bits and at least 2 bits described below. In addition, in some embodiments, as described above with reference to FIG. 16B, the RU allocation subfield may have a length of 8 bits, and the 8 bits may include at least 7 bits to be described later. The at least 2 bits to be described later may include one bit of the RU allocation subfield and one bit of the PS160 subfield. As shown in FIG. 27, operation S80' may include a plurality of operations S81 to S87. Hereinafter, a description of FIG. 27 that is redundant with the description of FIG. 26 will be omitted, and FIG. 26 will be described with reference to FIG. 17.

Referring to FIG. 27, in operation S81, the STA 20 may identify at least one RU based on K (at least 7) bits. The STA 20 may identify at least one RU defined in a subband with only the K bits, and may identify at least one RU based on at least one bit of the M (at least 2) bits to be described later as well as the K bits. The K bits of the user information field may be analyzed in operations (i.e., S82 to S87) following operation S81.

In operation S82, the STA 20 may determine whether a bandwidth corresponds to two subbands. When the bandwidth corresponds to the two subbands, in operation S83, the STA may identify the subband including the at least one RU based on one bit of M bits, and in operation S84 the STA 20 may identify the at least one RU based on the other bit(s) of the M bits. Hereafter, examples are described in which M equals two.

When the bandwidth does not correspond to the two subbands, in operation S85, the STA 20 may determine whether the bandwidth corresponds to four or more subbands. When the bandwidth includes four or more subbands, in operation S86, the STA 20 may identify a subband including the at least one RU based on the M bits. When the bandwidth does not include four or more subbands, the STA 20 may identify the at least one RU based on the M bits in operation S87.

Figure 28B:
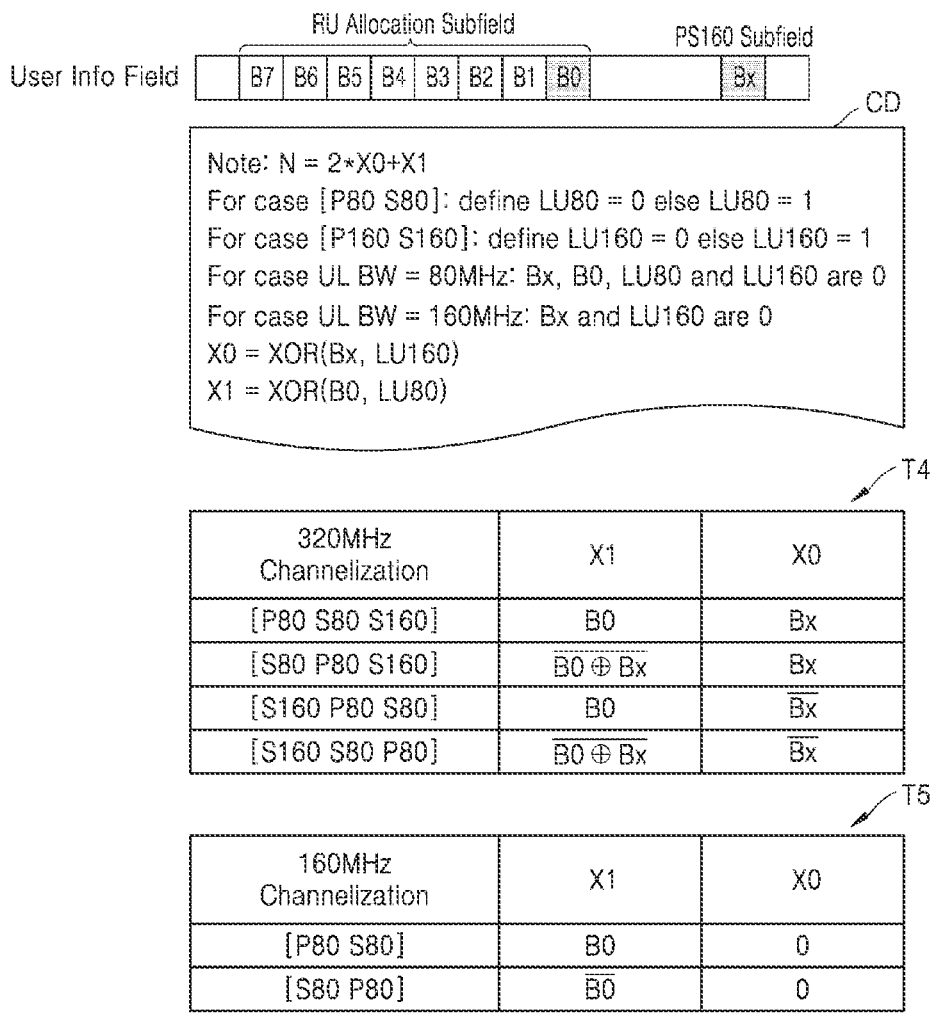

FIGS. 28A and 28B are diagrams illustrating examples of a user information field according to example embodiments. Specifically, FIG. 28A illustrates an example of an RU allocation subfield included in a user information field, and FIG. 28B illustrates an example of a user information field including the RU allocation subfield and a PS160 subfield.

Referring to FIG. 28A, the RU allocation subfield may include 9 bits, that is, first to ninth bits X0 to X8. The third to ninth bits X2 to X8 may correspond to at least 7 bits in FIGS. 26 and 27, and the first and second bits X0 and X1 may correspond to at least 2 bits in FIGS. 26 and 27. In some embodiments, the at least 2 bits of FIGS. 26 and 27 may include a least significant bit (LSB) of the RU allocation subfield as shown in FIG. 28A, and may include a most significant bit (MSB) or both the LSB and the MSB differently from that shown in FIG. 28A.

Referring to FIG. 28A, as described above with reference to FIGS. 26 and 27, when a bandwidth includes a plurality of subbands, the first bit X0 and/or the second bit X1 may define one of the plurality of subbands. As shown in a first table T1 of FIG. 28A, when the subband is 80 MHz in a bandwidth of 160 MHz, the second bit X1 may define a lower 80 MHz or an upper 80 MHz, and when the subband is 80 MHz in a bandwidth of 320 MHz, the first and second bits X0 and X1 may define one of lower 80 MHz and upper 80 MHz in the lower 160 MHz, and lower 80 MHz and upper 80 MHz in the upper 160 MHz. Accordingly, the second bit X1 of the RU allocation subfield defining at least one RU allocated to a primary 80 MHz in a bandwidth of 160 MHz may correspond to '0', and the second bit X1 of the RU allocation subfield defining at least one RU allocated to a secondary 80 MHz may correspond to '1'.

A second table T2 of FIG. 28A represents values of the first and second bits X0 and X1 for indicating at least one RU allocated to each 80 MHz according to a position of the primary 160 MHz and/or the primary 80 MHz in the bandwidth of 320 MHz. In the bandwidth of 160 MHz, the first bit X0 may be zero, and a third table T3 of FIG. 28A represents a value of the second bit X1 for indicating the at least one RU allocated to each 80 MHz according to the position of the primary 80 MHz in the bandwidth of 160 MHz. In a bandwidth of 80 MHz or less, the first bit X0 and the second bit X1 may be zero.

Referring to FIG. 28B, in some embodiments, the user information field may include an RU allocation subfield of 8 bits and a PS160 subfield of 1 bit. As shown in FIG. 28B, the RU allocation subfield may include first to eighth bits B0 to B7, and the PS160 subfield may include bits Bx. In some embodiments, the second to eighth bits B1 to B7 of the RU allocation subfield may correspond to at least 7 bits of FIGS. 26 and 27, and the first bit B0 of the RU allocation subfield and the bit Bx of the PS160 subfield may correspond to at least 2 bits of FIGS. 26 and 27. In some embodiments, the first bit B0 of the RU allocation subfield may be an LSB of the RU allocation subfield as shown in FIG. 28B, or may be an MSB different from that shown in FIG. 28B.

Referring to FIG. 28B, as described above with reference to FIGS. 26 and 27, when a bandwidth includes a plurality of subbands, the first bit B0 of the RU allocation subfield and the bit Bx of the PS160 subfield may define one subband among a plurality of subbands. In some embodiments, the first bit B0 of the RU allocation subfield may indicate a primary 80 MHz or a secondary 80 MHz for a single RU and/or multi-RUs of 80 MHz or less in the primary 160 MHz. In addition, the first bit B0 of the RU allocation subfield may be used to index multi-RUs with respect to a single RU and/or multi-RUs greater than 80 MHz. The bit Bx of the PS160 subfield may indicate a primary 160 MHz or a secondary 160 MHz with respect to a single RU and/or multi-RUs of 160 MHz or less. In addition, the bit Bx of the PS160 subfield may be used to index multi-RUs with respect to a single RU and/or multi-RUs greater than 160 MHz. Accordingly, the first bit X0 and the second bit X1 of FIG. 28A may be derived from the first bit B0 of the RU allocation subfield and the bit Bx of the PS160 subfield according to conditions defined by a pseudo code (CD) of FIG. 28B.

A fourth table T4 of FIG. 28B represents values of the first bit X0 and the second bit X1 of FIG. 28A respectively calculated from the first bit B0 of the RU allocation subfield and the bit Bx of the PS160 subfield according to the position of the primary 160 MHz and/or the primary 80 MHz in the bandwidth of 320 MHz. For example, as shown in FIG. 28B, when the secondary 80 MHz, the primary 80 MHz, and the secondary 160 MHz are sequentially arranged ([S80 P80 S160]), the first bit X0 of FIG. 28A may be same with the bit Bx of the PS160 subfield, and the second bit X1 of FIG. 28A may correspond to a negation (or a logical complement) of a logical sum (or an XOR operation result) of the first bit B0 of the RU allocation subfield and the bit Bx of the PS160 subfield. In addition, a fifth table T5 of FIG. 28B represents values of the first bit X0 and the second bit X1 of FIG. 28A calculated from the first bit B0 of the RU allocation subfield and the bit Bx of the PS160 subfield according to the position of the primary 80 Mhz in the bandwidth of 160 MHz. The bit Bx of the PS160 subfield may be zero in the bandwidth of 160 MHz. In addition, the bit Bx of the PS160 subfield and the first bit B0 of the RU allocation subfield may be zero in a bandwidth of 80 MHz or less. Hereinafter, the example of FIG. 28A will be mainly described, but it is noted that embodiments may also be applied to the example of FIG. 28B.

FIGS. 29A and 29B are diagrams illustrating an RU allocation subfield according to an embodiment. Specifically, FIGS. 29A and 29B represent separate tables for illustration purposes, and the tables of FIGS. 29A and 29B represent values of the RU allocation subfield and single RUs or multi-RUs corresponding to the values.

Referring to FIG. 29A, a small-size single RU, a small-size multi-RU, and multi-RUs including a 484-tone RU and a 242-tone RU may be included in subband of 80 MHz or less. Accordingly, as illustrated in FIG. 29A, the first and second bits X0 and X1 of the RU allocation subband may define a channel position, that is, a subband to which at least one RU is allocated. To define the small-size single RU, a small-size multi-RU described above with reference to FIGS. 18 to 25C, and multi-RUs including 484-tone RUs and 242-tone RUs, 7 bits of the RU allocation subband, that is, the third to ninth bits X2 to X8, may have values as shown in FIG. 29A.

An index of an RU may be calculated from the first and second bits X0 and X1. In some embodiments, as shown in FIG. 29A, a variable N may be calculated as "2*X0+X1", and the RU index may be calculated from the variable N. For example, an index of a 26-tone RU may correspond to a sum of "37*N" and an RU index of EHT, an index of a 52-tone RU may correspond to a sum of "16*N" and the RU index of EHT, an index of a 106-tone RU may correspond to a sum of "8*N" and the RU index of EHT, an index of a 242-tone RU may correspond to a sum of "4*N" and the RU index of EHT, an index of a 484-tone RU may correspond to a sum of "2*N" and the RU index of EHT, and an index of a 996-tone RU may correspond to a sum of N and the RU index of EHT. An index of a multi-RU including two 996-tone RUs may correspond to a sum of the first bit X0 and the RU index of EHT, an index of a multi-RU including four 996-tone RUs may be 1, an index of a multi-RU including a 52-tone RU and a 26-tone RU may correspond to a sum of "12*N" and the RU index of EHT, an index of a multi-RU including a 106-tone RU and a 26-tone RU may correspond to a sum of "8*N" and the RU index of EHT, and an index of a multi-RU including a 484-tone RU and a 242-tone RU may correspond to a sum of "4*N" and the RU index of EHT. Referring to FIG. 29B, to define a large-size multi-RU, except for the multi-RU including the 484-tone RU and the 242-tone RU, the first to ninth bits X0 to X8 of the RU allocation subband may have a value as shown in FIG. 29B. The index of the multi-RU of FIG. 29B may be calculated from the first bit X0. For example, an index of a multi-RU including the 996-tone RU and the 484-tone RU may correspond to a sum of "4*X0" and the RU index of EHT, and an index of a multi-RU including the 996-tone RU, the 484-tone RU and the 242-tone RU may correspond to a sum of "8*X0" and the RU index of EHT. Indexes of the remaining multi-RUs may be same with the RU indexes of EHT.

Values of RU allocation subbands defining large-size multi-RUs, except for the multi-RUs including the 484-tone RU and the 242-tone RU, will be described later with reference to FIGS. 30 to 34.

In some embodiments, only some of the single RU and/or the multi-RU shown in FIGS. 29A and 29B may be used for multi-user (MU) transmission. For example, MU-MIMO of EHT may be possible in a single RU and/or a multi-RU corresponding to 242 or more subcarriers. Accordingly, the AP may allocate at least one RU to a plurality of multiplexed STAs, and may generate the RU allocation subfield for MU transmission.

In some embodiments, the RU allocation subfield for MU transmission may have a structure similar to the RU allocation subfield for single user (SU) transmission. For example, the RU allocation subfield for MU transmission may include at least 6 bits representing a decimal value that sequentially increases according to values of the third to ninth bits X2 to X8 in cells hatched/shaded in FIG. 29A and cells shown in FIG. 29B. Accordingly, the AP may set the at least 6 bits of the RU allocation subfield based on the at least one RU for MU transmission, may set one bit of at least 2 bits to define one of the two subbands included in the bandwidth, and may set two bits of at least 2 bits to define one of four subbands included in the bandwidth. Accordingly, the RU allocation subfield for MU transmission may have a length of at least 8 bits.

The RU allocation subfield for MU transmission may be set independently from the RU allocation subfield for SU transmission. For example, the RU allocation subfield may have one of values for representing 28 single RUs, that is, sixteen 242-tone RUs, eight 484-tone RUs, and four 996-tone RUs. In addition, the RU allocation subfield may have one of values for representing 67 multi-RUs, that is, two multi-RUs each including two 996-tone RUs, a multi-RU including four 996-tone RUs, 16 multi-RUs each including a 484-tone RU and a 242-tone RU, 8 multi-RUs each including a 996-tone RU and a 484-tone RU, 6 multi-RUs each including a 996-tone RU, a 484-tone RU and a 242-tone RU, 12 multi-RUs each including two 996-tone RUs and a 484-tone RU, 4 multi-RUs each including three 996-tone RUs, and 8 multi-RUs each including three 996-tone RUs and a 484-tone RU. Accordingly, the RU allocation subfield for MU transmission may have one of a total of 95 values, and to this end, may have a length of at least 7 bits.

FIG. 30 shows values of multi-RUs including a 996-tone RU and a 484-tone RU and an RU allocation subfield according to an embodiment. In this case, the multi-RUs including the 996-tone RU and the 484-tone RU may have four different combinations within a subband, e.g., 160 MHz, as described above with reference to FIG. 24. Accordingly, the first bit X0 among the first and second bits X0 and X1 of the RU allocation subfield may define a subband (e.g., 160 MHz) including multi-RUs in a bandwidth of 320 MHz, whereas the second bit X1 may define multi-RUs together with the third to ninth bits X2 to X8. In particular, as shown in FIG. 30, the second and third bits X1 and X2 may represent locations of unallocated 484-tone RUs in the subband (e.g., 160 MHz). Accordingly, as described above with reference to FIGS. 24 and 25A, to define multi-RUs indexed based on the location of the unallocated 484-tone RU, the RU allocation subfield may have values shown in FIGS. 29B and 30. It is noted that herein, "unallocated" RUs may be "punctured" RUs, in which puncture frequencies of the RU are frequencies that are not used. Such puncturing of frequencies may be implemented to avoid interference with another AP that is using those frequencies in a communication with another STA.

FIG. 31 shows values of multi-RUs including a 996-tone RU, a 484-tone RU, and a 242-tone RU and an RU allocation subfield according to an embodiment. Here, the multi-RUs including the 996-tone RU, the 484-tone RU, and the 242-tone RU, as described above with reference to FIG. 24, may have eight different combinations within a subband, e.g., 160 MHz. Accordingly, the first bit X0 among the first and second bits X0 and X1 of the RU allocation subfield may define the subband (e.g., 160 MHz) including multi-RUs in a bandwidth of 320 MHz, and the second bit X1 may define multi-RUs together with the third to ninth bits X2 to X8. In particular, as shown in FIG. 31, the second to fourth bits X1 to X3 may indicate a location of the unallocated 242-tone RU in the subband (e.g., 160 MHz). Accordingly, as described above with reference to FIGS. 24 and 25B, to define multi-RUs indexed based on the location of the unallocated 242-tone RU, the RU allocation subfield may have values shown in FIGS. 29B and 31. (As noted earlier, a punctured RU is an example of an unallocated RU.)

FIG. 32 shows values of multi-RUs including two 996-tone RUs and 484-tone RUs and an RU allocation subfield according to an embodiment. In FIG. 32, the multi-RU including the two 996-tone RUs and the 484-tone RU may have 12 different combinations within a subband, e.g., 320 MHz, as described above with reference to FIG. 25B. Accordingly, the first and second bits X0 and X1 of the RU allocation subfield may define multi-RUs together with the third to ninth bits X2 to X8. As shown in FIG. 32, the first bit X0 may represent a location of an unallocated 996-tone RU in the subband (e.g., 320 MHz), and the second to fourth bits X1 to X3 may represent a location of an unallocated 484-tone RU. Accordingly, as described above with reference to FIG. 25B, to define multi-RUs indexed based on the locations of the unallocated 996-tone RU and 484-tone RU, the RU allocation subfield may have values shown in FIGS. 29B and 32.

FIG. 33 shows values of multi-RUs including three 996-tone RUs and an RU allocation subfield according to an embodiment. Referring to FIG. 33, the multi-RU including the three 996-tone RUs may have four different combinations within a subband, that is, 320 MHz, as described above with reference to FIG. 25C. Accordingly, the first and second bits X0 and X1 of the RU allocation subfield may define multi-RUs together with the third to ninth bits X2 to X8. In particular, as shown in FIG. 33, the first and second bits X0 and X1 may represent locations of unallocated 996-tone RUs in the subband (e.g., 320 MHz). Accordingly, as described above with reference to FIG. 25C, to define the multi-RU indexed based on the locations of the unallocated 996-tone RU, the RU allocation subfield may have values shown in FIGS. 29B and 33.

FIG. 34 shows values of multi-RUs including three 996-tone RUs and 484-tone RUs and an RU allocation subfield according to an embodiment. In this case, the multi-RU including the three 996-tone RUs and the 484-tone RUs may have eight different combinations within a subband, that is, 320 MHz, as described above with reference to FIG. Accordingly, the first and second bits X0 and X1 of the RU allocation subfield may define multi-RUs together with the third to ninth bits X2 to X8. As shown in FIG. 34, the first to third bits X0 to X2 may represent locations of unallocated 484-tone RUs in the subband (e.g., 320 MHz). Accordingly, as described above with reference to FIG. 25C, to define the multi-RU indexed based on the locations of the unallocated 484-tone RU, the RU allocation subfield may have values shown in FIGS. 29B and 34.

Figure 35:
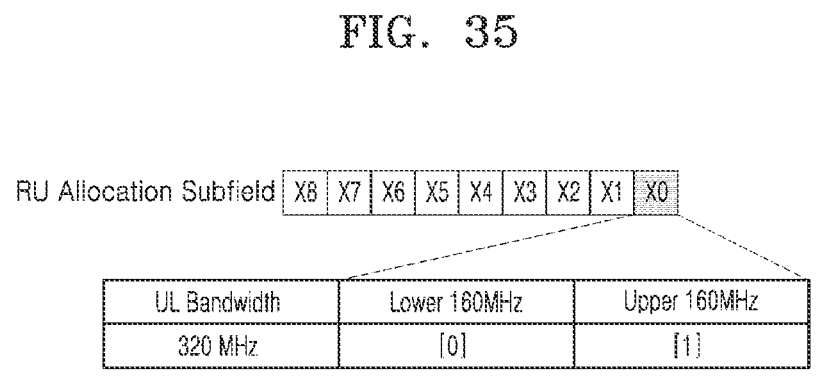

FIG. 35 is a diagram illustrating an RU allocation subfield according to an embodiment. In some embodiments, as shown in FIG. 35, the RU allocation subfield may include 9 bits, e.g., the first to ninth bits X0 to X8. Compared with the example of FIG. 28, the RU allocation subfield of FIG. 35 may include the first bit X0 for defining one of two sub-bands, that is, a lower 160 MHz and an upper 160 MHz, in a bandwidth of 320 MHz, and may include the second to ninth bits X1 to X8 for defining at least one RU. Accordingly, based on at least one RU allocated to a STA, that is, a single RU or the multi-RUs described above with reference to FIGS. 18 to 25C, an AP may set at least 8 bits, e.g., the second to ninth bits X1 to X8. In addition, the AP may set the first bit X0 to a value representing one of a lower 160 MHz and an upper 160 MHz when the subband is 160 MHz in a bandwidth of 320 MHz.

While aspects of the inventive concept have been particularly shown and described with reference to embodiments thereof, it will be understood that various changes in form and details may be made therein without departing from the spirit and scope of the inventive concept as defined by the following claims and their equivalents.

The invention claimed is:

1. A method of communicating, by a first device, with at least one second device in a wireless local area network (WLAN) system, the method comprising:
    allocating a multi-resource unit (RU) within a bandwidth to the at least one second device, the multi-RU including at least two single RUs;
    generating at least one subfield defining the multi-RU; and
    transmitting a physical layer protocol data unit (PPDU) including the at least one subfield to the at least one second device,
    wherein the generating the at least one subfield comprises:
    generating at least seven bits in a first subfield based on a size of the multi-RU and an index of the multi-RU; and
    generating at least one first bit in the first subfield and at least one second bit in a second subfield based on a subband where the multi-RU is located within the bandwidth,
    wherein the first subfield is a RU allocation subfield, and the second subfield is a PS 160 subfield.

2. The method of claim 1, wherein the at least one first bit and the at least one second bit indicate the subband among four subbands within the bandwidth.

3. The method of claim 1, wherein the at least one second bit indicates the subband among two subbands within the bandwidth; and the at least one first bit indicates the at least two single RUs in combination with the at least seven bits.

4. The method of claim 1, wherein the at least one first bit and the at least one second bit indicate the at least two single RUs in combination with the at least seven bits.

5. The method of claim 1, wherein the at least one first bit and the at least one second bit indicate the subband including at least one single RU that is unallocated to the at least one second device.

6. A method of communicating, by a second device, with a first device in a wireless local area network (WLAN) system, the method comprising:
    receiving a physical layer protocol data unit (PPDU) from the first device;
    extracting at least one subfield defining a multi-resource unit (RU) allocated to the second device within a bandwidth, the multi-RU including at least two single RUs; and
    identifying the multi-RU based on the at least one subfield,
    wherein the identifying the multi-RU comprises:
    identifying a size of the multi-RU based on at least seven bits in a first subfield included in the at least one subfield and
    identifying, based on at least one first bit in the first subfield and at least one second bit in a second subfield included in the at least one subfield, a subband where the multi-RU is located within the bandwidth,
    wherein the first subfield is an RU allocation subfield, and the second subfield is a PS 160 subfield.

7. The method of claim 6, wherein the identifying of the subband comprises identifying the subband among four subbands within the bandwidth based on the at least one first bit and the at least one second bit.

8. The method of claim 7, wherein the extracting the at least one subfield comprises:
    extracting the first subfield including the at least one first bit and the at least seven bits; and
    extracting the second subfield including the at least one second bit.

9. The method of claim 6, wherein the identifying the subband comprises:
    identifying the subband among two subbands within the bandwidth based on the at least one second bit.

10. The method of claim 6, wherein the identifying the multi-RU comprises:
    identifying the at least two single RUs based on the at least one first bit, the at least one second bit and the at least seven bits.

11. The method of claim 10, wherein the at least one first bit and the at least one second bit indicate the subband including at least one single RU that is unallocated to the at least one second device.

12. The method of claim 10, wherein the at least seven bits indicate the at least one single RU.

* * * * *